(12) United States Patent
Hayakawa

(10) Patent No.: US 10,366,611 B2
(45) Date of Patent: Jul. 30, 2019

(54) PARKING SUPPORT INFORMATION DISPLAY METHOD AND PARKING SUPPORT DEVICE

(71) Applicant: Nissan Motor Co., Ltd., Yokohama-shi, Kanagawa (JP)

(72) Inventor: Yasuhisa Hayakawa, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 15/768,963

(22) PCT Filed: Oct. 22, 2015

(86) PCT No.: PCT/JP2015/079890
§ 371 (c)(1),
(2) Date: Apr. 17, 2018

(87) PCT Pub. No.: WO2017/068696
PCT Pub. Date: Apr. 27, 2017

(65) Prior Publication Data
US 2018/0308358 A1 Oct. 25, 2018

(51) Int. Cl.
*G08G 1/14* (2006.01)
*B62D 15/02* (2006.01)
(Continued)

(52) U.S. Cl.
CPC .......... *G08G 1/145* (2013.01); *B62D 15/02* (2013.01); *B62D 15/027* (2013.01); *B62D 15/028* (2013.01); *B62D 15/0285* (2013.01); *G01C 21/26* (2013.01); *G06K 9/00812* (2013.01); *G08G 1/143* (2013.01); *G08G 1/144* (2013.01); *G08G 1/168* (2013.01); *G09B 29/10* (2013.01)

(58) Field of Classification Search
None
See application file for complete search history.

(56) References Cited

U.S. PATENT DOCUMENTS 8,497,782 B2 * 7/2013 Barth ................. B62D 15/0285
  180/204
8,542,130 B2 * 9/2013 Lavoie ............... B62D 15/0285
  180/199

(Continued)

FOREIGN PATENT DOCUMENTS

JP  2008-080959 A  4/2008
JP  2008-083990 A  4/2008
(Continued)

*Primary Examiner* — Chico A Foxx
(74) *Attorney, Agent, or Firm* — Young Basile Hanlon & MacFarlane, P.C.

(57) ABSTRACT

A method of displaying parking assist information is used in a parking assist apparatus comprising a display and a control device. The control device specifies a parking space on the basis of a parking condition that is preliminarily defined, and displays the specified parking space in a predetermined display region defined on a display surface of the display. When the area of a region that is occupied by the parking space and displayed in the display region is less than a predetermined value, the control device displays a specific mark on the display. The mark indicates that the parking space that is not displayed in the display region exists.

16 Claims, 20 Drawing Sheets

(51) Int. Cl.
*G09B 29/10* (2006.01)
*G01C 21/26* (2006.01)
*G06K 9/00* (2006.01)
*G08G 1/16* (2006.01)

(56) References Cited

U.S. PATENT DOCUMENTS

| | | | | |
|---|---|---|---|---|
| 8,571,722 | B2* | 10/2013 | Samples | G08G 1/168 701/1 |
| 8,988,250 | B2* | 3/2015 | Suzuki | B60R 1/00 340/932.2 |
| 9,544,549 | B2* | 1/2017 | Vovkushevsky | B60R 1/00 |
| 2003/0122687 | A1* | 7/2003 | Trajkovic | B60Q 9/005 340/932.2 |
| 2007/0290823 | A1* | 12/2007 | Watanabe | B60Q 1/2665 340/435 |
| 2010/0060485 | A1* | 3/2010 | Kim | G08G 1/143 340/932.2 |
| 2010/0238051 | A1* | 9/2010 | Suzuki | B60R 1/00 340/932.2 |
| 2013/0073119 | A1* | 3/2013 | Huger | B62D 15/027 701/1 |
| 2013/0169792 | A1 | 7/2013 | Mathes et al. | |
| 2014/0121883 | A1* | 5/2014 | Shen | B62D 15/0285 701/28 |
| 2014/0163862 | A1* | 6/2014 | Choi | G01C 21/26 701/400 |
| 2016/0042643 | A1* | 2/2016 | Hohenacker | G08G 1/04 705/13 |
| 2016/0284217 | A1* | 9/2016 | Lee | G08G 1/143 |
| 2016/0288832 | A1* | 10/2016 | Tani | B62D 15/028 |
| 2016/0379389 | A1* | 12/2016 | Fukada | B60K 35/00 345/589 |
| 2017/0134662 | A1* | 5/2017 | Kosaka | H04N 5/23293 |
| 2017/0144654 | A1* | 5/2017 | Sham | B60W 30/06 |
| 2017/0225702 | A1* | 8/2017 | Yamada | B60W 50/10 |
| 2017/0355307 | A1* | 12/2017 | Ha | G08G 1/143 |
| 2018/0130351 | A1* | 5/2018 | Ha | B60R 1/00 |

FOREIGN PATENT DOCUMENTS

| | | |
|---|---|---|
| JP | 2008-096362 A | 4/2008 |
| JP | 2013-007668 A | 1/2013 |
| JP | 2014-162451 A | 9/2014 |
| JP | 2015-069429 A | 4/2015 |
| JP | 2015-074262 A | 4/2015 |
| WO | 2010070920 A1 | 6/2010 |
| WO | 2012/086052 A1 | 6/2012 |

* cited by examiner

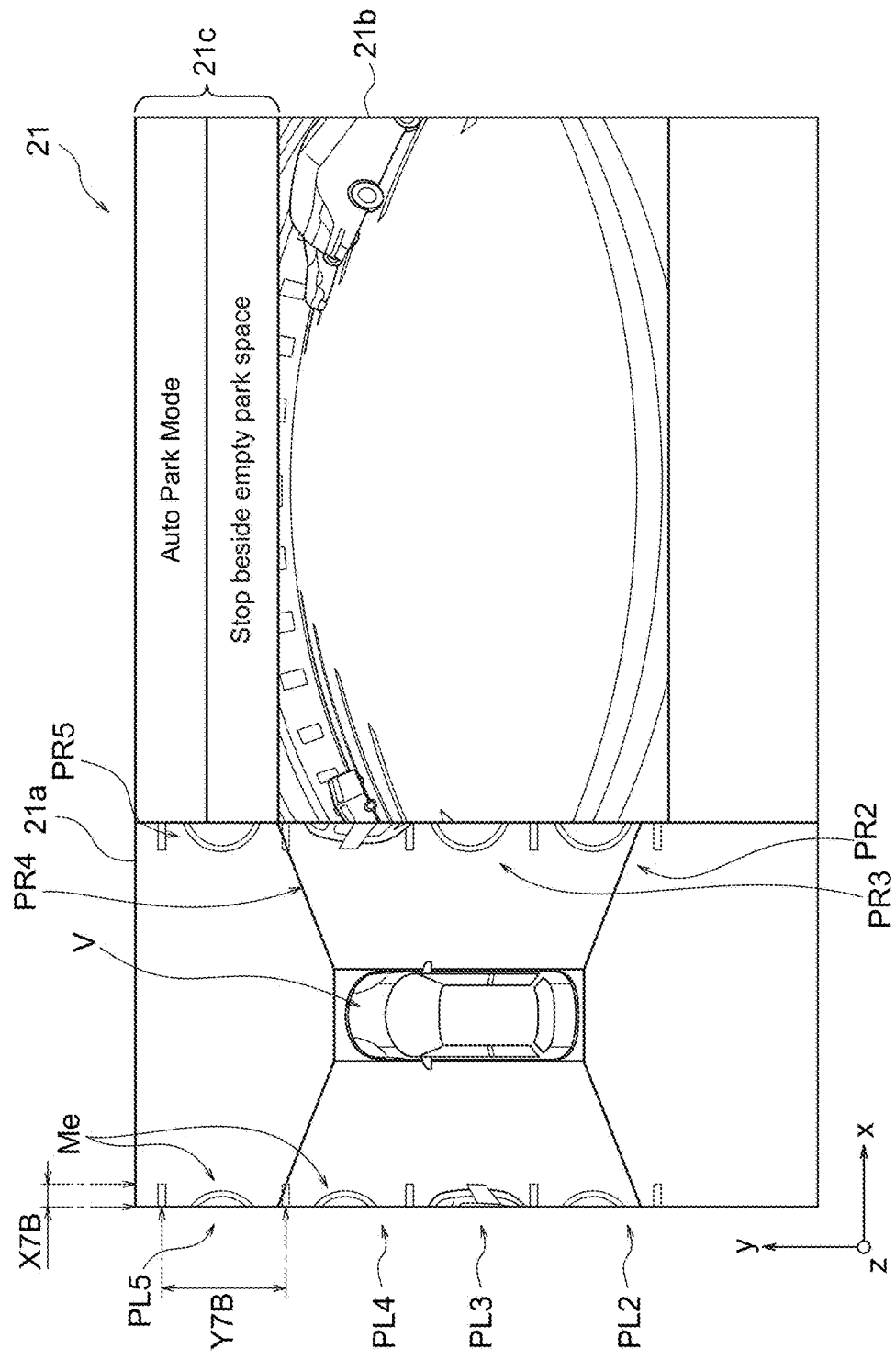

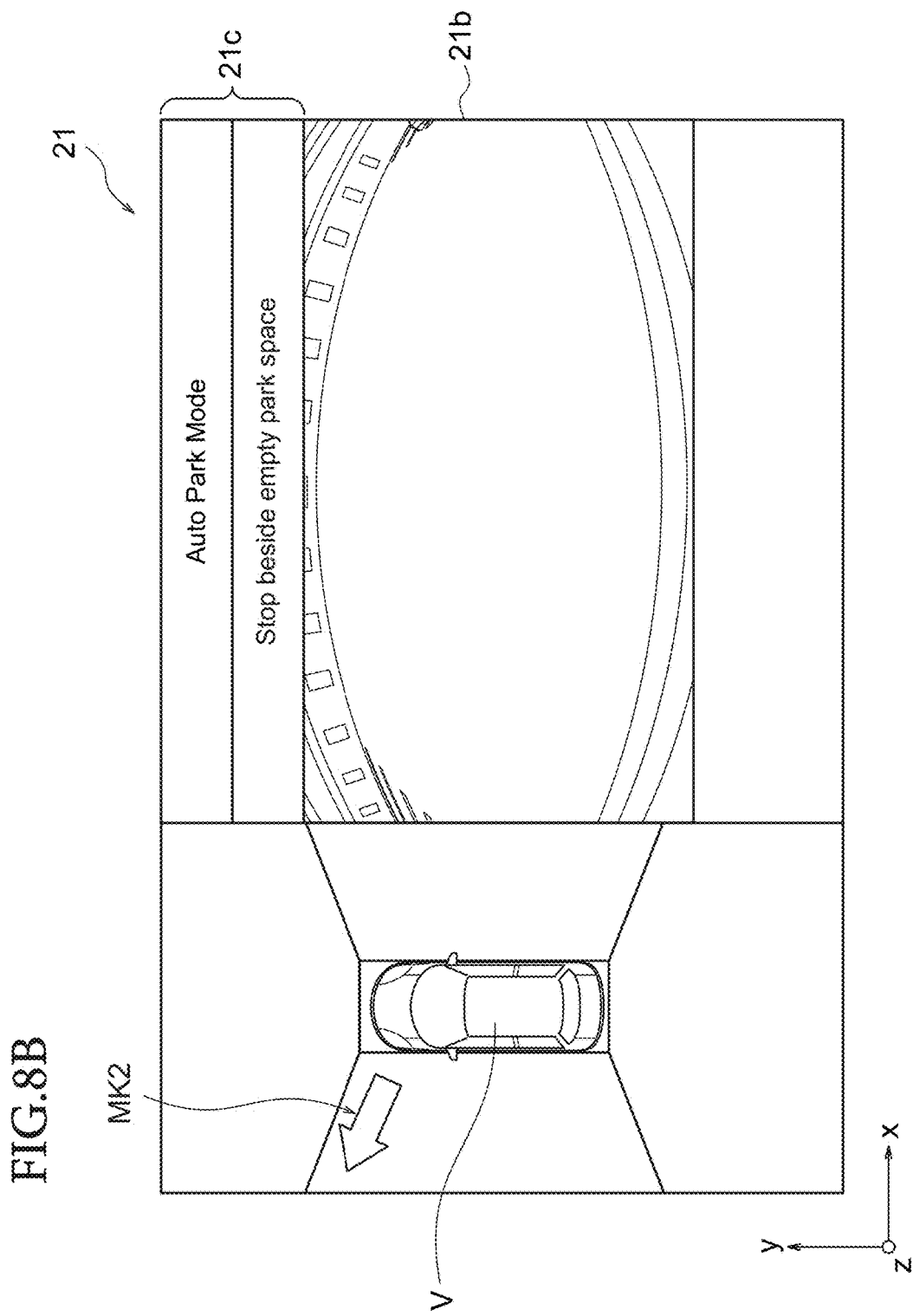

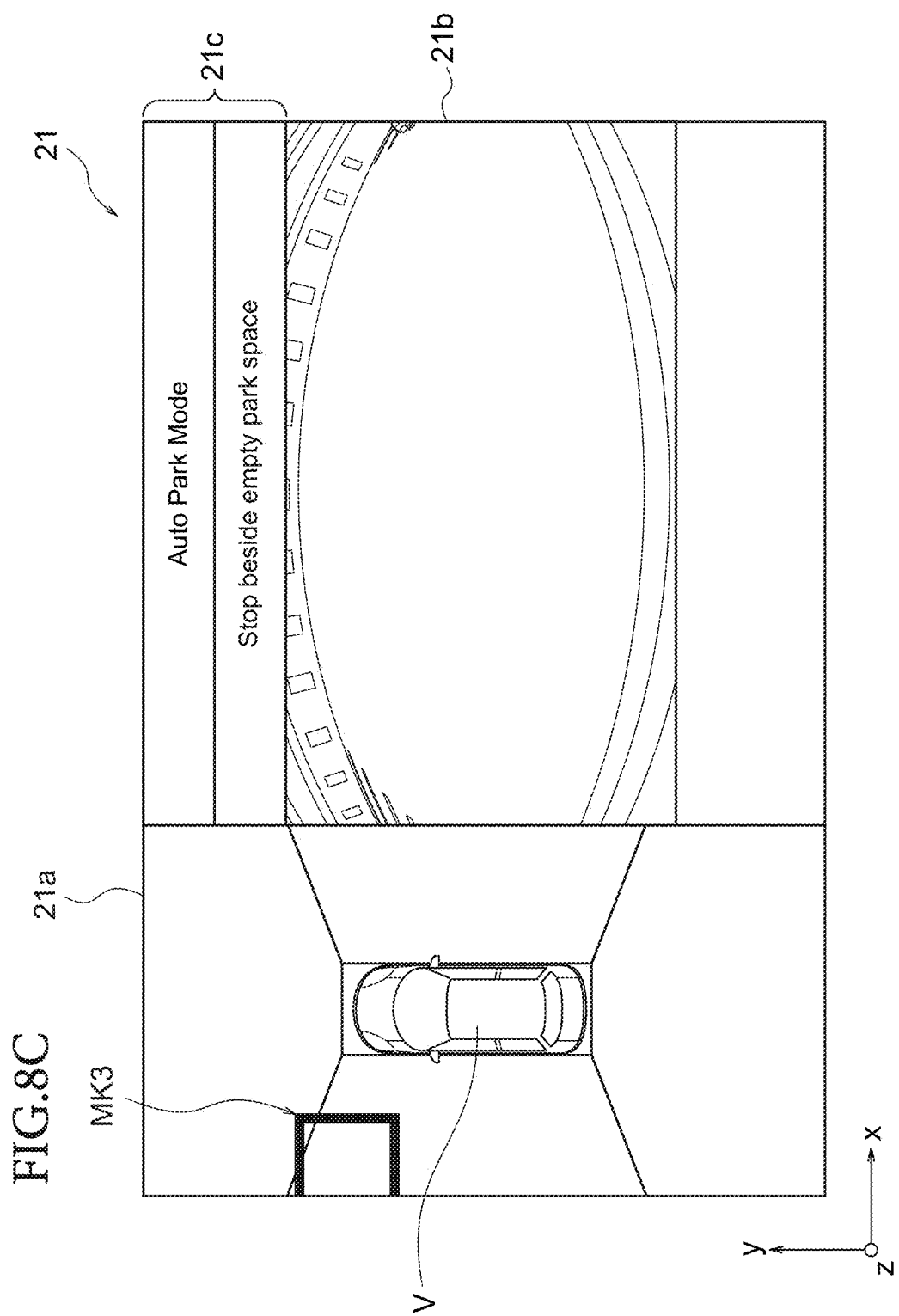

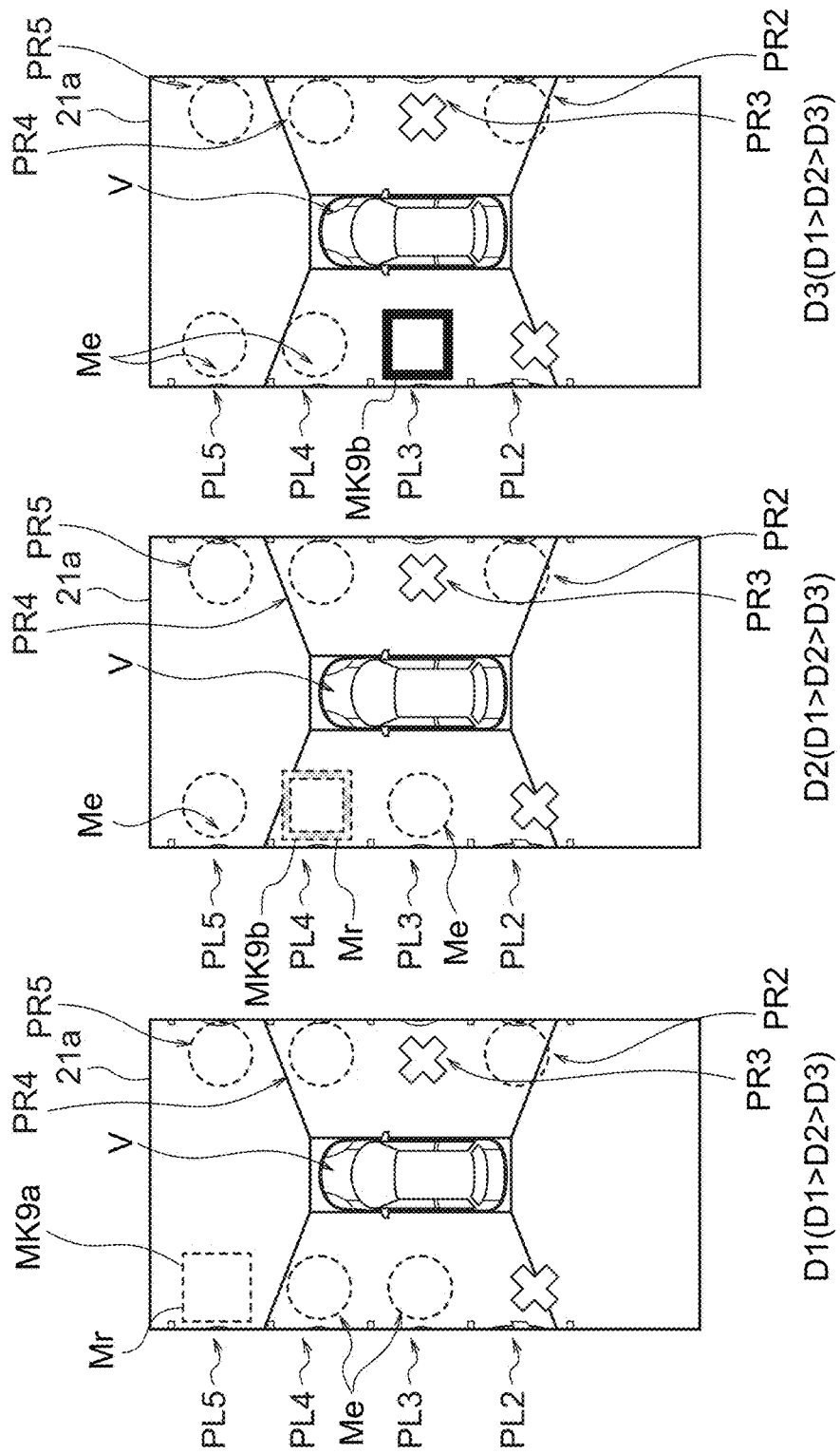

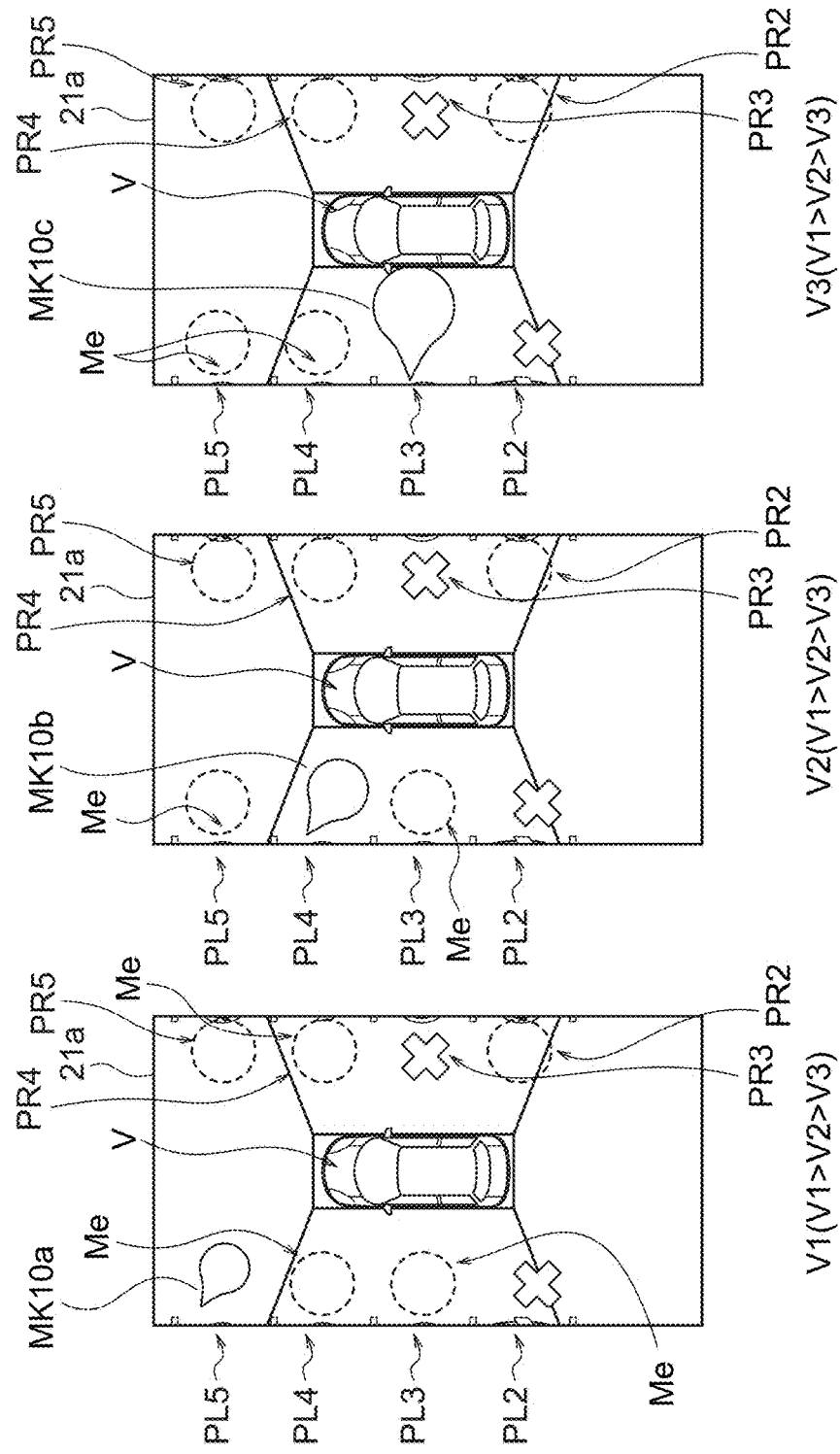

PARKING SUPPORT INFORMATION DISPLAY METHOD AND PARKING SUPPORT DEVICE

TECHNICAL FIELD

The present invention relates to a method of displaying parking assist information and a parking assist apparatus.

BACKGROUND

With regard to this kind of apparatus, a technique is known which includes superimposing and displaying an image of elongated lines of a parking frame when a part of a detected parking space falls outside a display area (see Japanese Patent Application Publication No. 2008-83990A.

In parking assist, when parking spaces which the driver can utilize are limited to those displayed on a display, the driver cannot use parking spaces that exist outside the display area. This may be problematic.

A problem to be solved by the present invention is to allow the driver to use a parking space even when the parking space is not displayed in the display region of a display.

SUMMARY

The present invention solves the above problem by displaying a specific mark when the area of a region that is occupied by a parking space and displayed in the display region of a display is less than a predetermined value. The mark indicates that the parking space exists in a region that is not displayed in the display region.

According to the present invention, by displaying such a mark, the driver can be informed that an available parking space exists outside a display area. The driver can therefore use a parking space that is not displayed in the display region of a display, even when the parking space is not displayed in the display region.

BRIEF DESCRIPTION OF THE DRAWINGS

FIG. 7B is a second view illustrating an example of parking assist information presented in the parking assist process according to one or more embodiments of the present invention;

FIG. 8B is a second view illustrating a displaying/displaying example of the parking assist information.

FIG. 8C is a third view illustrating a display/displaying example of the parking assist information;

FIGS. 10A-10C are views illustrating display/displaying examples of the parking assist information in accordance with distances;

FIGS. 11A-11C are views illustrating display/displaying examples of the parking assist information in accordance with speeds.

DETAILED DESCRIPTION

Hereinafter, one or more embodiments of the present invention will be described with reference to the drawings. In the embodiments, the present invention will be described by exemplifying an example in which a parking assist apparatus according to the present invention is applied to a parking assist system equipped in a vehicle. The parking assist apparatus may be applied to a portable terminal device (equipment such as smartphone and PDA) capable of exchanging information with onboard devices. The method of displaying parking assist information according to the present invention can be used in the parking assist apparatus. Parking assist information relating to the invention of this displaying method is specifically displayed using a display 21.

Parking assist apparatus 100 according to one or more embodiments of the present invention may also be a semi-automated type in which the steering operation is automatically performed while the driver performs the accelerator/brake operation. In addition or alternatively, the parking assist apparatus 100 according to one or more embodiments of the present invention may be a remote-control type in which a vehicle with no driver therein is parked into a predetermined parking space by controlling the movement of the vehicle form the outside operator.

Figure 1:
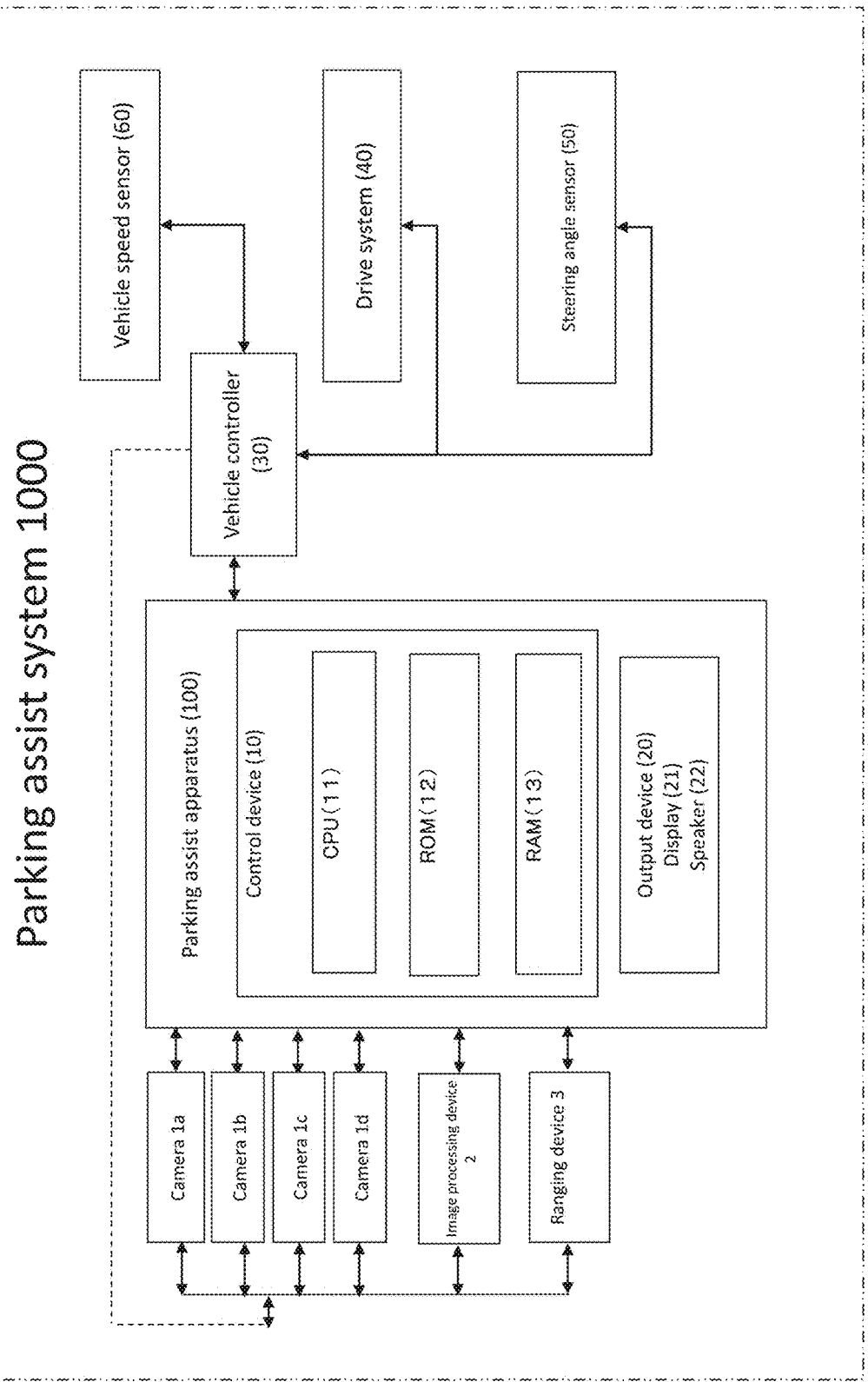
FIG. 1 is a block diagram illustrating an example of a parking assist system according to one or more embodiments of the present invention.

FIG. 1 is a block diagram of a parking assist system 1000 having the parking assist apparatus 100 according to one or more embodiments of the present invention. The parking assist system 1000 according to one or more embodiments of the present invention assists an operation of moving (parking) a subject vehicle into a parking space. The parking assist system 1000 includes cameras 1a to 1d, an image processing device 2, a ranging device 3, the parking assist apparatus 100, a vehicle controller 30, a drive system 40, a steering angle sensor 50, and a vehicle speed sensor 60. The parking assist apparatus 100 includes a control device 10 and an output device 20.

The output device 20 includes a display 21 and a speaker 22. These components are connected to one another via a controller area network (CAN) or other in-vehicle LAN to mutually exchange information. The output device 20 informs the driver of parking assist information. The display 21 notifies the driver of the parking assist information in accordance with the content of text, the content of a display image, and the form of a display image. The display 21 according to one or more embodiments of the present invention is a touch panel type display having an input function and an output function. The speaker 22 announces the parking assist information, which is expressed by text and/or sound, to the driver via sound and/or voice.

The control device 10 of the parking assist apparatus 100 according to one or more embodiments of the present invention is a specific computer comprising a ROM 12 that stores a parking assist program, a CPU as an operation circuit that executes the program stored in the ROM 12 to serve as the parking assist apparatus 100 according to one or more embodiments of the present invention, and a RAM 13 that serves as an accessible storage device. The parking assist program includes a program of a display process for the parking assist information.

The parking assist program according to one or more embodiments of the present invention is a program for execution of a control procedure of presenting the parking assist information, which includes information on available parking spaces, on the display 21 and assisting an operation to park the subject vehicle V into a parking space set by the driver. In the parking assist program according to one or more embodiments of the present invention, the parking space for parking may be automatically set.

The parking assist apparatus 100 according to one or more embodiments of the present invention can be applied to an automated parking system with which a vehicle is automatically parked through operations of the steering, accelerator, and brake and can also be applied to a semiautomated parking system with which a part of operations of the steering, accelerator, and brake is manually performed and other operations are automatically performed. In another embodiment of the present invention, the parking assist apparatus 100 can be applied to a system that assists parking through presenting a route to the parking space and guiding the subject vehicle to the parking space.

The control device 10 of the parking assist apparatus 100 according to one or more embodiments of the present invention has functions of executing an information acquisition process, an available parking space detection process, a recommended parking space detection process, a display control process, and a parking control process. Each of the above processes is executed by cooperation of software for implementing the process and the above-described hardware.

Figure 2:
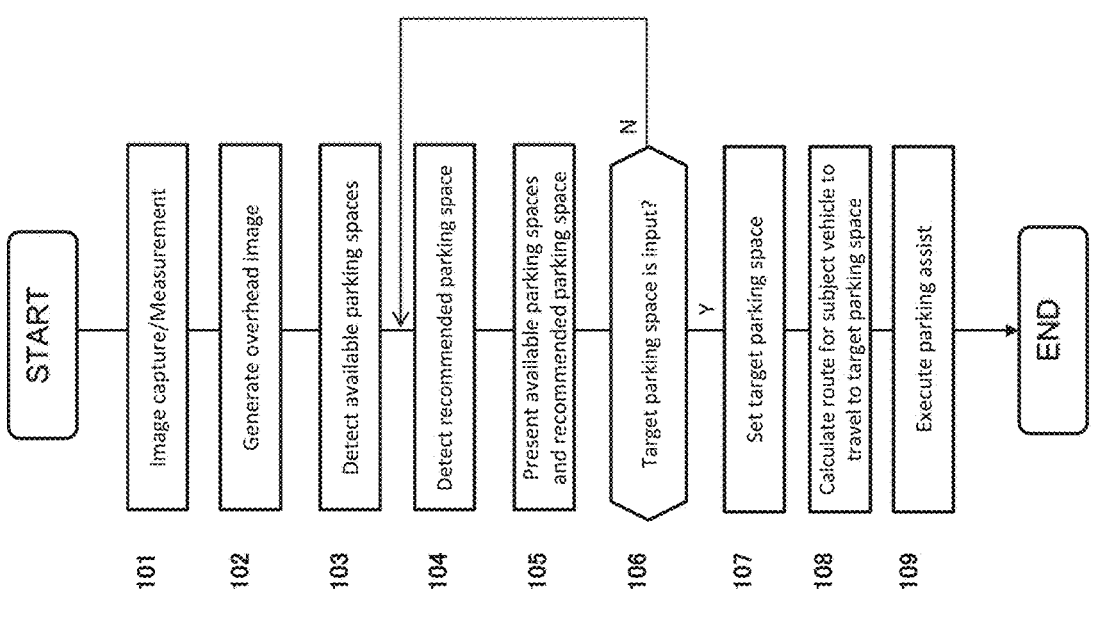
FIG. 2 is a flowchart illustrating an example of a control procedure in the parking assist system according to one or more embodiments of the present invention.

FIG. 2 is a flowchart illustrating a control procedure of the parking assist process executed by the parking assist system 1000 according to one or more embodiments of the present invention. The trigger for starting the parking assist process is not particularly limited, and the parking assist process may be triggered by the operation of a start switch of the parking assist apparatus 100.

The parking assist apparatus 100 according to one or more embodiments of the present invention has a function for automatically moving the subject vehicle V to the parking space. In this process according to one or more embodiments of the present invention, an input device is used which includes a switch that is turned on only while being pressed, such as a deadman switch. The parking assist apparatus 100 is configured such that, when the Deadman switch is pressed, the automated operation of the subject vehicle V is executed, and when the pressing of the Deadman switch is released, the automated operation of the subject vehicle V is suspended. The input device according to one or more embodiments of the present invention can be disposed as an onboard device in the vehicle compartment. In addition or alternatively, the input device may be configured as a portable device that can be carried outside the vehicle compartment so that the subject vehicle V can be controlled by the outside operator. The input device includes a communication device and can exchange information with the parking assist apparatus 100. The input device communicates with the parking assist apparatus 100 using a signal including a unique identification number.

In step 101, the control device 10 of the parking assist apparatus 100 according to one or more embodiments of the present invention acquires images captured by the cameras 1a to 1d attached to multiple sites of the subject vehicle V. The cameras 1a to 1d capture images of boundary lines of parking spaces around the subject vehicle V and objects existing around the parking spaces. The cameras 1a to 1d may be CCD cameras, infrared cameras, or other appropriate imaging devices. The ranging device 3 may be provided at the same position as any of the cameras 1a to 1d or may also be provided at a different position. The ranging device 3 may be a radar device, such as a millimeter-wave radar, laser radar and ultrasonic radar, or a sonar. The ranging device 3 detects the presence or absence of objects, positions of the objects, and distances to the objects on the basis of the received signal of the radar device. Such objects include obstacles, pedestrian, and other vehicles around the vehicle. The received signal is used to determine whether or not the parking space is empty (whether or not a vehicle is parked in the parking space). Obstacles may be detected using the motion stereo technique by the cameras 1a to 1d.

Figure 3:
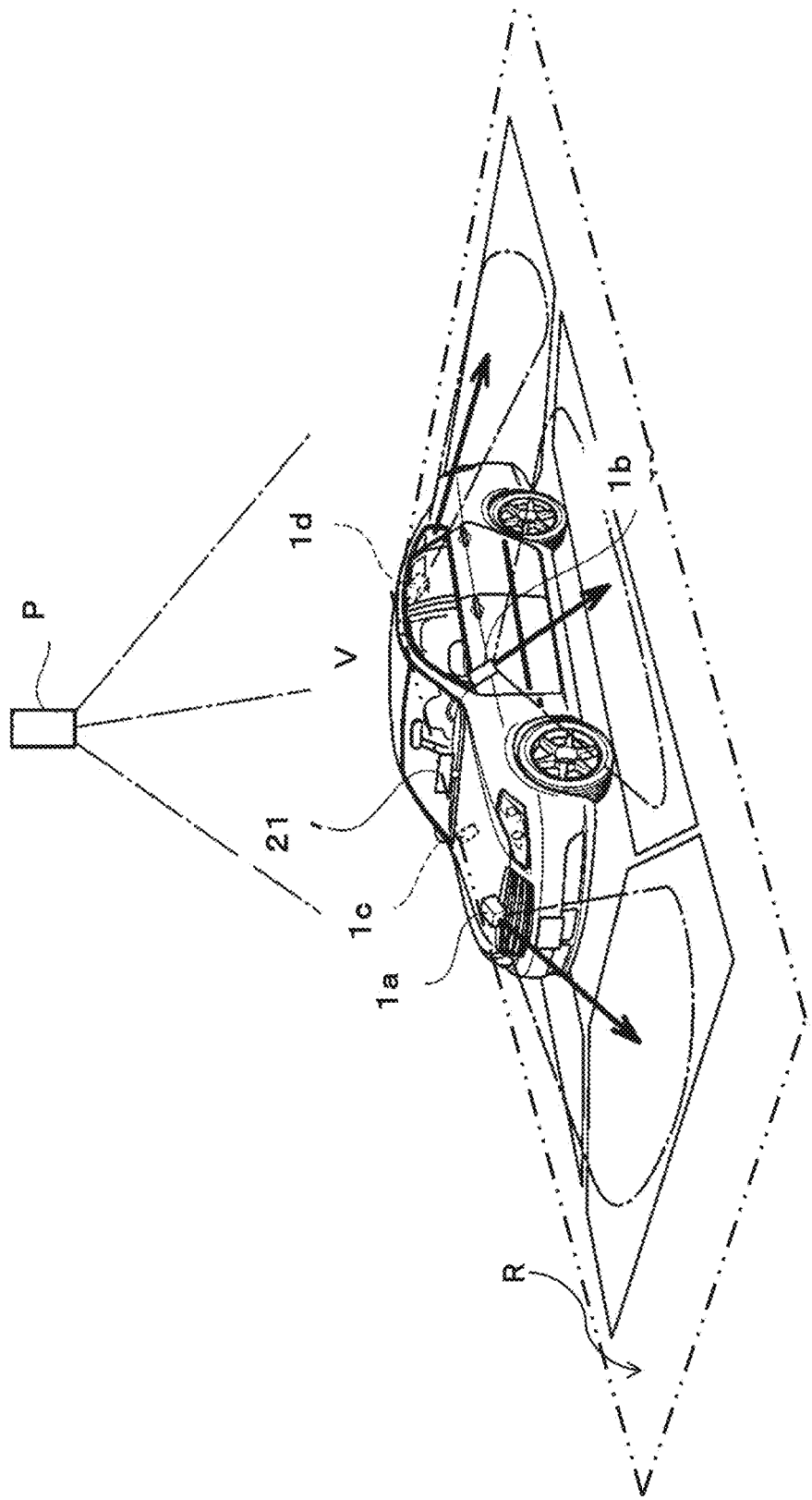
FIG. 3 is a view illustrating an example of positions at which onboard cameras are arranged according to one or more embodiments of the present invention.

FIG. 3 is a view illustrating an exemplary arrangement of the cameras 1a to 1d disposed on the subject vehicle V. In the example illustrated in FIG. 3, the camera 1a is disposed on the front grille part of the subject vehicle V, the camera 1d is disposed in the vicinity of the rear bumper, and the cameras 1b and 1c are disposed on the lower parts of the right and left door mirrors. The cameras 1a to 1d may each be a camera having a wide-angle lens with a wide view angle.

In step 101, the control device 10 also acquires ranging signals from the ranging device 3, which may be a plurality of modules attached to multiple sites of the subject vehicle V.

Figure 7A:
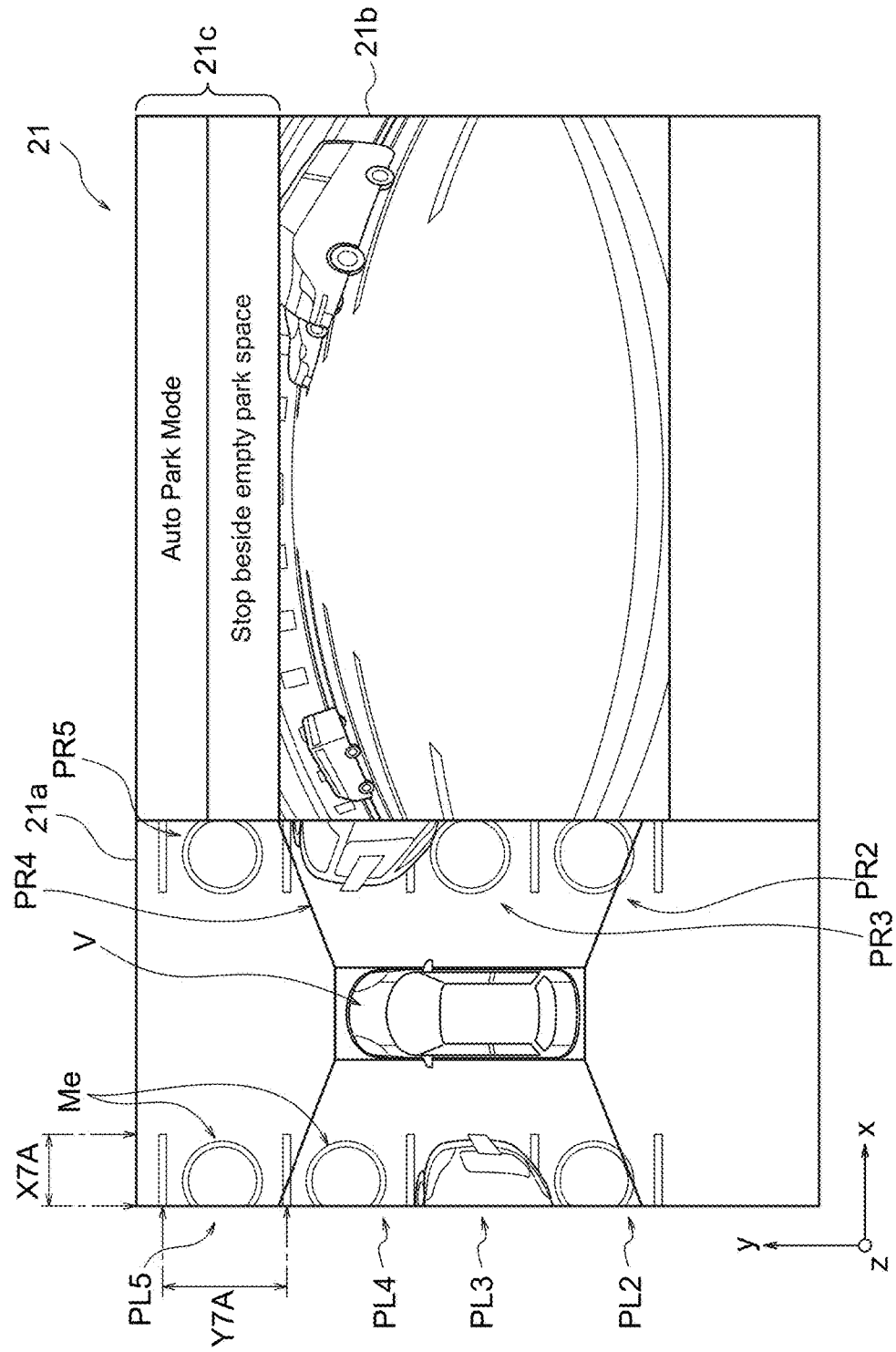
FIG. 7A is a first view illustrating an example of parking assist information presented in the parking assist process according to one or more embodiments of the present invention.

In step 102, the control device 10 of the parking assist apparatus 100 controls the image processing device 2 to generate an overhead image. On the basis of the acquired plurality of captured images, the image processing device 2 generates an overhead image in which the surrounding state including the subject vehicle V and the parking space for the subject vehicle V to park is viewed from a virtual viewpoint P (see FIG. 3) above the subject vehicle V. The image processing performed by the image processing device 2 may be conducted, for example, using a method as disclosed in "Development of Around View System, Proceedings of Society of JSAE Annual Congress, 116-07 (October 2007), pp. 17-22, SUZUKI Masayasu, CHINOMI Satoshi, TAKANO Teruhisa." One example of an overhead image 21*a* is illustrated in FIG. 7A, which will be described later. This figure illustrates a display example that simultaneously displays the overhead image (top view) 21*a* around the subject vehicle V and a monitoring image (normal view) 21*b* around the subject vehicle V.

Referring again to FIG. 2, in steps 103 and 104, the control device 10 detects parking spaces on the basis of a "parking condition" that is preliminarily defined. In one or more embodiments of the present invention, an exemplary case will be described in which the process of specifying available parking spaces and a recommended parking space is a process of detecting the available parking spaces and the recommended parking space. In one or more embodiments of the present invention, the parking assist apparatus 100 detects parking spaces that satisfy the "parking condition," thereby to specify the "available parking spaces" and the "recommended parking space(s)." Processing of specifying the "available parking spaces" and the "recommended parking space(s)" are not limited to those with a detection process, and the "available parking spaces" and "recommended parking space(s)" to be processed may be specified using identification information of the "available parking spaces" and "recommended parking space(s)" which are detected by an external device.

First, the "parking condition" will be described. The parking condition according to one or more embodiments of the present invention includes the following items:

1. Detection condition for parking frame lines;
2. Detection condition for parking spaces;
3. Parking possible condition; and
4. Parking recommendation condition.

The "detection condition for parking frame lines" is a condition for detecting a diagram that represents parking spaces from captured images of a road surface. The "detection condition for parking spaces" is a condition for detecting parking spaces from the diagram of a road surface. The "parking possible condition" is a condition for detecting available parking spaces into which parking is possible. The "parking recommendation condition" is a condition for narrowing down the available parking spaces to a recommended parking space into which parking is recommended for the subject vehicle V. These conditions may each be employed alone as the "parking condition," or a combination of two or more of these conditions may also be employed as the "parking condition."

In step 103, the control device 10 detects parking frame lines to detect parking spaces on the basis of the images captured by the cameras 1*a* to 1*d* and/or the data received by the ranging device 3 and uses these information items to detect available parking spaces Me. In one or more embodiments of the present invention, the available parking spaces are detected from the images captured by the cameras 1*a* to 1*d*, but the process of detecting the available parking spaces is not particularly limited. In an alternative embodiment, information may be acquired from an external server to detect (specify) the available parking spaces.

A method of detecting the available parking spaces Me will be described below. The control device 10 determines whether or not the subject vehicle V is traveling in an area that includes parking spaces (such an area will also be referred to as a "parking area," hereinafter), on the basis of the vehicle speed of the subject vehicle V. For example, when the vehicle speed of the subject vehicle V is a predetermined vehicle speed threshold or less and this state continues for a predetermined time or more, the control device 10 determines that the subject vehicle V is traveling in a parking area. The control device 10 determines whether or not the subject vehicle V is traveling in a parking area, on the basis of an attribute of the positional information of a navigation system (not illustrated) (information that the point is included in a parking lot). When the detected positional information has an attribute that represents a parking area such as an area including parking spaces of a highway, for example, a determination is made that the subject vehicle V is traveling in the parking area. In one or more embodiments of the present invention, a determination may be made as to whether or not the detected area is an area including parking spaces, on the basis of information obtained from a device located outside the vehicle via road-to-vehicle communication or vehicle-to-vehicle communication.

When a determination is made that the subject vehicle V is traveling in a parking area, the control device 10 detects white lines on the basis of the captured images acquired for generation of an overhead image. White lines represent boundary lines that define frames (regions) of parking spaces. The control device 10 performs edge detection on the captured images to calculate a luminance difference (contrast). The control device 10 specifies a pixel line having a luminance difference of a predetermined value or more from the overhead image and calculates the width and length of the line. In one or more embodiments of the present invention, frame lines representing parking spaces may not necessarily be white, and other colors such as red may also be employed.

The control device 10 detects lines that satisfy the following condition "1. Detection condition for parking frame lines" as parking frame lines. In one or more embodiments of the present invention, a diagram that satisfies all of (1) to (6) is detected as representing parking frame lines. In an alternative embodiment, any one or more of (1) to (6) may be selected and applied.

1. Detection Condition for Parking Frame Lines (1) The luminance difference of edges is a predetermined threshold or more.

(2) The angle of a line is a predetermined threshold or less.

(3) The width of a line is a predetermined threshold or less.

(4) The length of a continuous edge (line) is a predetermined value or more.

(5) The luminance difference of noise between lines is less than a predetermined threshold.

(6) The likelihood representing the probability as parking frame lines calculated based on the assessment/evaluation values of the above (1) to (5) is a predetermined value or more.

The control device 10 detects parking spaces from candidates of the detected parking frame lines using a known image processing technique such as pattern matching. Specifically, the control device 10 detects parking frame lines that satisfy the following condition "2. Detection condition for parking spaces," as parking spaces. In one or more embodiments of the present invention, parking frame lines that satisfy all of the following (1) to (3) of the "2. Detection condition for parking spaces" are detected as parking spaces. The control device 10 has been described as detecting parking spaces from candidates of the detected parking frame lines using a known image processing technique such as pattern matching, but one or more embodiments of the present invention are not limited to this, and parking spaces may be directly detected without detecting parking frame lines. For example, empty spaces having a predetermined range (size) may be detected as parking spaces, or locations at which parking maneuvers were executed in past times may be detected as parking spaces. If a condition that is preliminarily set to define the probability of being parking spaces is satisfied, the parking spaces can be directly detected without detecting parking frame lines.

2. Detection Condition for Parking Spaces (1) Lines extracted as candidates of parking frame lines do not include a line having a length equal to or larger than a first threshold that is preliminarily set (e.g. a length corresponding to an actual distance of 15 [m]).

(2) Lines extracted as candidates of parking frame lines do not include a line having a length equal to or smaller than a second threshold that is preliminarily set (e.g. a length corresponding to an actual distance of 3 to 5 [m]), and a pair of approximately parallel lines does not include a line having a length equal to or larger than a third threshold that is preliminarily set (e.g. a length corresponding to an actual distance of 7 [m]).

(3) Lines extracted as candidates of parking frame lines do not include a line having a length equal to or smaller than a forth threshold that is preliminarily set (e.g. a length corresponding to an actual distance of 2.5 to 5 [m]), and a pair of approximately parallel lines does not include a line having a length equal to or larger than a fourth threshold that is preliminarily set (e.g. a length corresponding to an actual distance of 15 [m]).

Positional information of parking spaces may be stored so as to be included in map information of a navigation system or may also be acquired from an external server or a management device of facilities (parking lots).

Figure 4A:
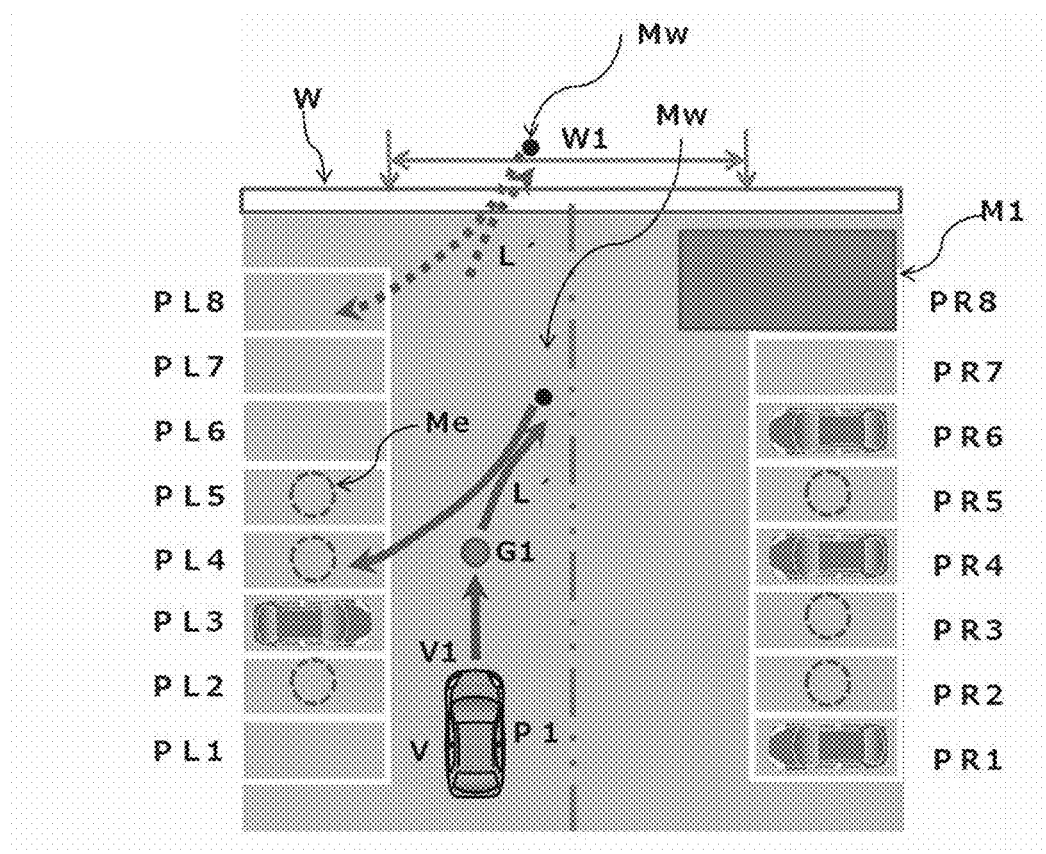
FIG. 4A is a first view for describing an example of a parking assist process according to one or more embodiments of the present invention.

FIG. 4A is a first diagram illustrating an example of the parking assist process according to one or more embodiments of the present invention. In FIG. 4A, the position of the subject vehicle V traveling is P1 and the vehicle speed is V1. The control device 10 detects parking spaces into which the subject vehicle V moving in the direction of the arrow (indicated ahead of the subject vehicle V) can be parked. The position of the subject vehicle V may be represented by the position of the center of gravity V0 of the subject vehicle V, the position of the front bumper of the subject vehicle V, or the position of the rear bumper of the subject vehicle V.

After detecting the parking spaces, the control device 10 detects empty parking spaces in accordance with the following parking possible condition using the detection data from the ranging device 3/image processing device 2.

The control device 10 stores the "parking possible condition" for extracting the available parking spaces Me. The "parking possible condition" is included in the "parking condition." The "parking possible condition" is defined from the viewpoint of extracting parking spaces into which parking is possible. The "parking possible condition" is preferably defined from the viewpoint of the distance from the subject vehicle V, the viewpoint as to whether or not other vehicles are parked, and the viewpoint of presence or absence of obstacles. On the basis of the "parking possible condition," the control device 10 detects the available parking spaces Me into which the subject vehicle V can be parked. The available parking spaces Me are parking spaces into which the subject vehicle V can be parked.

3. Parking Possible Condition

The "parking possible condition" according to one or more embodiments of the present invention is defined from the viewpoint of extracting parking spaces into which the subject vehicle V can be parked.

(1) The distance is within a predetermined distance from the subject vehicle V.

(2) The parking space is empty.

(3) No obstacles are present.

The control device 10 determines whether or not obstacles are present in the parking spaces. In the parking area illustrated in FIG. 4A, the control device 10 does not detect parking spaces PR1, PR4, PR6, and PL 3 as the available parking spaces Me because other vehicles are parked therein. Similarly, the control device 10 does not detect a parking space PR8 as the available parking space Me because an obstacle M1 is present therein.

The control device 10 detects a parking space to which the subject vehicle V can move/drive/travel. When a route for the subject vehicle V to move to a parking space can be derived, the control device 10 determines that the subject vehicle V can be parked into the parking space. FIG. 4A illustrates a route L when the subject vehicle V is parked by automated driving. The route L is a route on which the subject vehicle V moves from the current position to an intermediate position Mw located ahead of the subject vehicle V and reverses to complete the parking maneuver into a parking space PL. Such parking maneuver includes one or more turns for parking. Parking spaces to which the routes on the road surface cannot be obtained due to existence of obstacles such as a wall are not detected as the parking spaces into which parking is possible. For example, the route (represented by arrows L of broken lines) to a parking space PL8 cannot be obtained because the wall W is an obstacle. The control device 10 therefore does not detect the parking space PL8 as the available parking space Me.

Although not particularly limited, in the position P1 of the subject vehicle V, the control device 10 detects parking spaces that are located ahead of a reference position of the subject vehicle V and belong to a range of a predetermined distance from the subject vehicle V, as available parking spaces. The reference position of the subject vehicle V can be freely set. Although not particularly limited, in FIG. 4A, parking spaces PL2 to PL5 and PR2 to PR5 belong to the range of detection of the available parking spaces Me. The control device 10 can be configured so as not to detect a parking space PL1 as the available parking space Me because the parking space PL1 will be located behind the subject vehicle V within a certain time. The range of detection can be expanded in accordance with the performance of the cameras 1a to 1d and ranging device 3. Although not particularly limited, the parking assist apparatus 100 according to one or more embodiments of the present invention presents the parking information regarding this range of detection to the driver and/or passenger (operator/occupant). As will be understood, the detection range is not limited to the range of parking spaces PL2 to PL5 and PR2 to PR5 and may also be, for example, the range of parking spaces PL1 to PL8 and PR1 to PR8. The range of detection may be limited to a range that includes the parking spaces PR1 to PR8 on the right side of the subject vehicle V and may also be limited to a range that includes the parking space PL1 to PL8 on the left side of the subject vehicle V.

Although not particularly limited, the control device 10 according to one or more embodiments of the present invention detects those, among parking spaces, which are empty (no other vehicles are parked) and belong to a predetermined range of detection and for which routes L can be derived, as the available parking spaces Me. The situation that routes L can be derived refers to a condition that the trajectories of routes L can be rendered on a coordinate system of the road surface without interfering with obstacles (including parked vehicles).

In the example illustrated in FIG. 4A, the control device 10 detects the parking spaces PL2, PL4, PL5, PR2, PR3, and PR5 as the available parking spaces Me within the range of detection. The detected available parking spaces Me are each displayed with a broken line circle Me which is a parking available mark.

Subsequently, the routine proceeds to step 104 in which the control device 10 detects a recommended parking space Mr in accordance with the following parking recommendation condition.

4. Parking Recommendation Condition

The "parking recommendation condition" according to one or more embodiments of the present invention is defined from the viewpoint of extracting a parking space with which the cost required for parking (also referred to as a "parking-related cost," here and hereinafter) is low.

(1) The number of turns for parking is a predetermined number or less.

(2) The time required for parking is a predetermined time or less.

(3) The travel distance required for parking is a predetermined distance or less.

The control device 10 detects the recommended parking space Mr in accordance with the traveling state of the subject vehicle V from among the detected plurality of available parking spaces. The control device 10 stores the "parking recommendation condition" for extracting the recommended parking space Mr. The "parking recommendation condition" is defined from the viewpoint of extracting a parking space with which the parking-related cost is low. The "parking recommendation condition" is preferably defined from the viewpoints of the number of turns for parking, the time required for parking, and the travel distance required for parking. On the basis of the "parking recommendation condition," the control device 10 extracts the recommended parking space Mr, with which the parking-related cost is low, from among the available parking spaces.

A method of detecting the recommended parking space Mr will be described below. The control device 10 calculates the parking-related cost for parking into each available parking space. The parking-related cost includes those relating to the time required for parking, the number of operations required for parking (such as the number of steering operations and the number of brake/accelerator operations), and the travel distance required for parking. The control device 10 obtains a route for parking into each available parking space Me and calculates the time required for parking, the number of operations, and the travel distance on the route. The control device 10 calculates the parking-related cost on the basis of the calculation results of each route.

The control device 10 calculates the route when parking the subject vehicle V into each available parking space Me. The route is a trajectory from the position at which the parking assist process is started (start position) to the position at which the subject vehicle V arrives at a parking completion position in each available parking space Me. The control device 10 sets the start position for each available parking space Me. The control device 10 calculates a route from the start position to each available parking space Me. The number of routes for automated driving is not limited to one, and the control device 10 may calculate a plurality of routes in accordance with the surrounding situations.

Costs are different, such as those relating to the number of turns for parking on a route, the length of the route, the time for moving along the route (time for parking), and the maximum steering angle, which are calculated for each available parking space Me. The smaller the number of turns for parking, the shorter the time required for parking (the parking-related cost is small). The shorter the length of the route, the shorter the time required for parking (the parking-related cost is small). The smaller the maximum steering angle, the shorter the time required for parking (the parking-related cost is small). On the other hand, the larger the number of turns for parking, the longer the time required for parking (the parking-related cost is large). The longer the length of the route, the longer the time required for parking (the parking-related cost is large). The larger the maximum steering angle, the longer the time required for parking (the parking-related cost is large).

Description will be made, for example, for an exemplary case in which the subject vehicle V is parked into an available parking space PL6 or PL7 illustrated in FIG. 4A. The distance from the parking space PL7 to the wall W is shorter than the distance from the parking space PL6 to the wall W. The number of turns for parking when parking into the parking space PL7 is larger than the number of turns for parking when parking into the parking space PL6 (the parking-related cost is higher in the former case). The time required for parking into the parking space PL7 is longer than the time required for parking into the parking space PL6 (the parking-related cost is higher in the former case).

The control device 10 calculates the parking-related cost (including the time for parking) of each available parking space and stores the parking-related cost so that it is associated with the identifier of each available parking space. The control device 10 calculates the parking-related cost for parking into each available parking space Me using any one or more of the parking-related cost in accordance with the number of turns for parking on the route, the parking-related cost in accordance with the length of the route, the parking-related cost in accordance with the time for moving along the route (time for parking), and the parking-related cost in accordance with the maximum steering angle. Each parking-related cost may be calculated such that weighting is defined in accordance with the type.

Then, a recommended parking space in accordance with a gaze point distance is detected.

The control device 10 calculates the gaze point distance on the basis of the vehicle speed of the subject vehicle V. The gaze point distance refers to a distance from the position of the subject vehicle V to the position (gaze point) which the driver of the subject vehicle V gazes on. The control device 10 detects the parking space corresponding to the position which the driver gazes on, as the recommended parking space.

In general, the higher the vehicle speed, the farther the driver gazes on, and the lower the vehicle speed, the closer the driver gazes on. From the viewpoint of recommending a parking space in accordance with the observing point of the driver, the control device 10 sets a longer gaze point distance as the vehicle speed of the subject vehicle V is higher, and sets a shorter gaze point distance as the vehicle speed of the subject vehicle V is lower. This allows the parking assist into the parking space to be executed in accordance with the intention of the driver. The gaze point distance is not necessarily linear and may also be defined along a curve. The direction of the gaze point distance can be set in accordance with the steering angle of the subject vehicle V.

Figure 5:
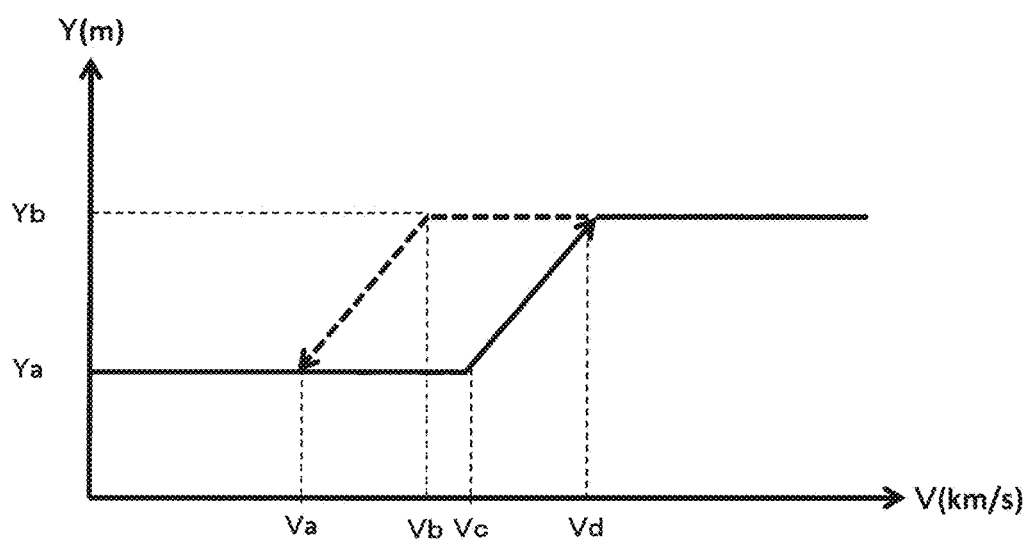
FIG. 5 is a graph illustrating the relationship between a vehicle speed (V [km]) and a gaze point distance (Y [m])

FIG. 5 is a graph illustrating the relationship between the vehicle speed (V [km/s]) and the gaze point distance (Y [m]). The solid line represents the above relationship when the vehicle speed increases while the broken line represents the above relationship when the vehicle speed decreases. As illustrated in FIG. 5, when the vehicle speed is Va or lower, the gaze point distance is Ya. Also when the vehicle speed is Va or higher and Vc or lower, the gaze point distance is Ya. When the vehicle speed is Vc or higher and Vd or lower, the gaze point distance Y increases in proportion to the vehicle speed V. When the vehicle speed is Vd or higher, the gaze point distance is Yb. On the other hand, when the vehicle speed lowers below Vd, the gaze point distance decreases along the broken line of FIG. 5. While the vehicle speed lowers from Vd to Vb, the gaze point distance is Yb. While the vehicle speed lowers from Vb to Va, the gaze point distance Y decreases in proportion to the vehicle speed V. Thus, the relationship between the vehicle speed V and the gaze point distance Y has a hysteresis characteristic between the increasing direction and decreasing direction of the vehicle speed V.

The ROM 12 of the control device 10 stores a map (e.g. the relationship illustrated in FIG. 5) between the vehicle speed V and the gaze point distance Y. The control device 10 acquires the information on the vehicle speed V from the vehicle speed sensor 60 and refers to the map to calculate the gaze point distance Y in accordance with the vehicle speed V. The control device 10 detects a parking space in the vicinity of the gaze point which is separate from the subject vehicle V by the gaze point distance Y (i.e., the parking space is located within a predetermined distance from the gaze point).

If the vehicle speed decreases when the recommended parking space is presented, the gaze point distance of the driver decreases and the gaze point comes close to the subject vehicle V (moves toward the near side of the subject vehicle V). If, in response to this approach of the gaze point, the recommended parking space is changed from a distant one (e.g. the parking space PL5) to a nearby one (e.g. the parking space PL4), the position of the recommended parking space Mr will move in the direction of approaching the subject vehicle V (in the rearward direction of the subject vehicle) even though the subject vehicle V moves frontward on the screen. Such movement of the recommended parking space Mr is unnatural and may confuse the driver. As illustrated in FIG. 5, the parking assist apparatus 100 according to one or more embodiments of the present invention is designed such that the gaze point distance when the vehicle speed decreases has a hysteresis characteristic. Such a hysteresis characteristic allows the gaze point distance Yd to be maintained even when the vehicle speed decreases. This can prevent unnatural display such that the position of the recommended parking space Mr moves backward in the traveling direction of the subject vehicle V and approaches the subject vehicle V. In the parking assist apparatus 100 according to one or more embodiments of the present invention, the previously-described parking recommendation condition may include the gaze point distance. This enables recommendation of the parking space in accordance with the observing point of the driver.

Figure 4B:
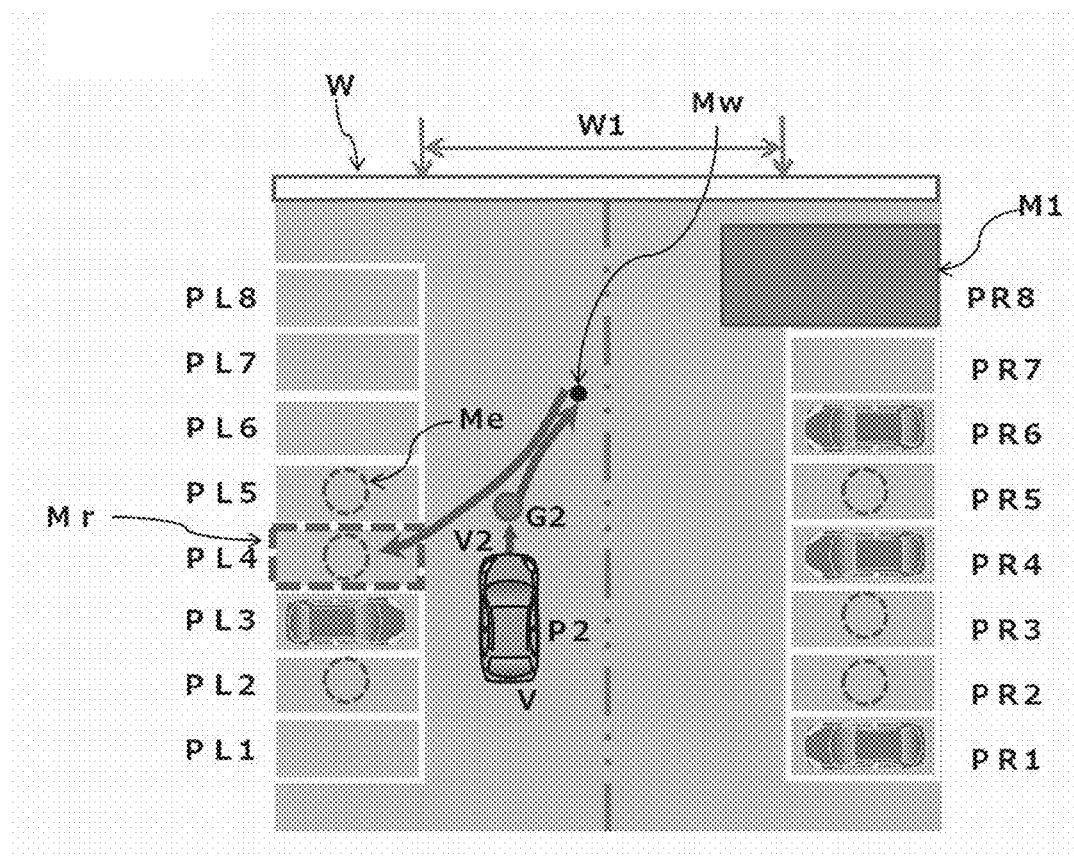
FIG. 4B is a second view for describing an example of the parking assist process according to one or more embodiments of the present invention.

FIG. 4B illustrates a state in which the subject vehicle V moves forward from the position P1 illustrated in FIG. 4A to a position P 2. The speed of the subject vehicle V at the position P2 is V2 (<V1). The control device 10 refers to the map to calculate the gaze point distance Y corresponding to the vehicle speed V2. The control device 10 specifies a point G2 that is separate from the position P2 by the gaze point distance, as a gaze point (G2). The subject vehicle V is in a state of selecting a parking space with the lowered vehicle speed V2 (<V1). The distance between the gaze point G2 and the subject vehicle V is shorter than the distance between the gaze point G1 illustrated in FIG. 4A and the subject vehicle V because the vehicle speed is lowered.

In the state illustrated in FIG. 4B, the control device 10 detects a recommended parking space from among the available parking spaces PL2, PL4, PL5, PR2, PR3, and PR5 in the vicinity of the gaze point G2. The control device 10 detects the recommended parking space on the basis of the parking-related cost for each of the parking spaces PL2, PL4, PL5, PR2, PR3, and PR5.

The control device 10 assigns identification numbers to the available parking spaces Me in the vicinity of the gaze point G2. The control device 10 calculates the parking-related cost for parking into each available parking space Me. The control device 10 may read out the parking-related cost which is previously calculated. The parking-related cost for parking into each available parking space Me reflects a load such as a time for parking required for moving the subject vehicle V to the parking space by automated driving, the number of operations, and the moving distance. The parking-related cost is a different index from the difficulty level when the driver completes the parking maneuver. The control device 10 calculates the time required for parking into each available parking space Me. In the example of FIG. 4B, the control device 10 calculates the time required for parking into each of the parking spaces PL2, PL4, PL5, PR2, PR3, and PR5 into which parking is possible, and stores the time required for parking such that it is associated with each identification number.

The control device 10 compares the parking-related cost for parking into each available parking space Me and a predetermined threshold that is preliminarily set. The predetermined threshold is the upper limit threshold of the parking-related cost which includes the time required for parking by automated driving. When the time (parking-related cost) required for parking into an available parking space Me is less than the predetermined threshold, the control device 10 detects the available parking space Me as the recommended parking space Mr. On the other hand, when the time (parking-related cost) required for parking into an available parking space Me is not less than the predetermined threshold, the control device 10 does not detect the available parking space Me as the recommended parking space Mr. An available parking space Me with which the time required for parking is minimum (the cost is lowest) may be detected as the only recommended parking space Mr.

The control device 10 detects an available parking space Me, among the available parking spaces Me, with which the parking-related cost is lowest, as the recommended parking space Mr. In the example illustrated in FIG. 4B, the parking space PL4 is detected as the recommended parking space Mr because the parking-related cost (the time required for parking) is lower than the predetermined threshold and the gaze point is closest (the cost is lowest).

Figure 4C:
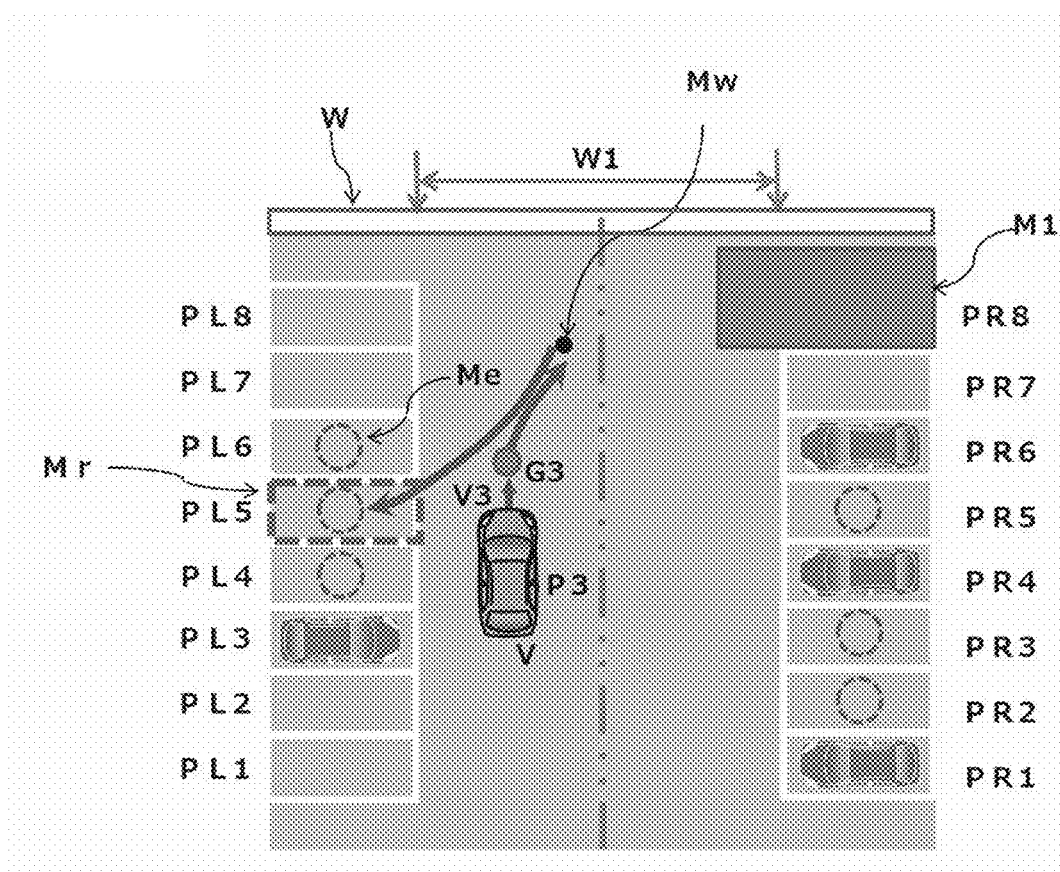
FIG. 4C is a third view for describing an example of the parking assist process according to one or more embodiments of the present invention.

The control device 10 executes the detection process for the recommended parking space Mr at a predetermined cycle. As illustrated in FIG. 4C, also when the subject vehicle V moves forward to the position P3 at a vehicle speed of V3, the control device 10 detects a new recommended parking space Mr. The control device 10 calculates a new gaze point G3 and the parking-related cost required for moving from the current position to each available parking space Me and detects the parking space PL5, with which the parking-related cost is lowest, as the recommended parking space Mr.

In step 105, the control device 10 displays the available parking spaces Me and the recommended parking space Mr on the display 21. The method of displaying the available parking spaces Me and the recommended parking space Mr according to one or more embodiments of the present invention will be described later in detail.

In step 106, a determination is made as to whether or not a target parking space Mo is input. The target parking space Mo refers to a parking space into which the vehicle is parked by automated driving, that is, a target position in automated driving. Information specifying the target parking space Mo is input by the driver or a passenger. For example, when the display 21 is a touch panel-type display, the driver or a passenger touches a portion representing a desired parking space thereby to specify the target parking space Mo, and specific information on the target parking space Mo is input to the control device 10. When the target parking space Mo is input in step 106, the control flow proceeds to step 107. On the other hand, when the target parking space Mo is not input, the control flow returns to step 104, and the control flow from step 104 to step 106 is executed.

When the target parking space Mo is input, this parking space is set as the target parking space Mo in step S107.

In step 108, the control device 10 calculates a route for moving the subject vehicle V to the target parking space Mo.

Figure 4D:
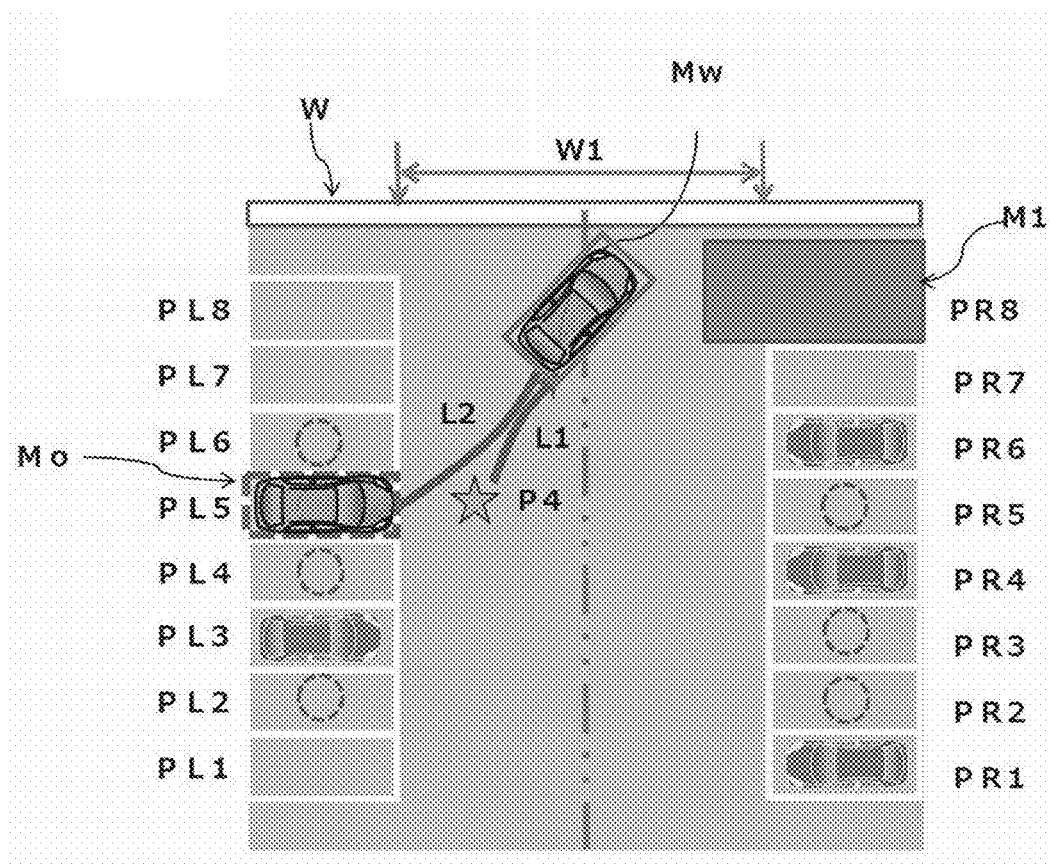
FIG. 4D is a fourth view for describing an example of the parking assist process according to one or more embodiments of the present invention.

FIG. 4D is a view illustrating a scene in which the parking space PL5 is specified as the target parking space Mo. The control device 10 calculates a route for parking on the basis of the positional relationship between the position P4 of the subject vehicle V at which the parking maneuver (movement) is started and the position of the target parking space Mo. Although not particularly limited, the control device 10 calculates the route to include a curve L1 and a curve L2. The curve L1 lies from the stop position of the subject vehicle V, that is, a position at which the parking assist is started, to the intermediate position Mw at which the turn for parking is performed. The curve L2 lies from the intermediate position Mw to the target parking space Mo (PL5).

The control device 10 reads routes corresponding to the selected parking mode and calculates a route on the basis of the positional relationship between the position of the subject vehicle V when starting the automated parking process and the position of the target parking space Mo. When the driver presses the previously-described Deadman switch during the operation of the automated parking mode, the control device 10 controls the vehicle controller 30 to execute the process of moving the subject vehicle V to the target parking space Mo on the calculated route.

Figure 6A:
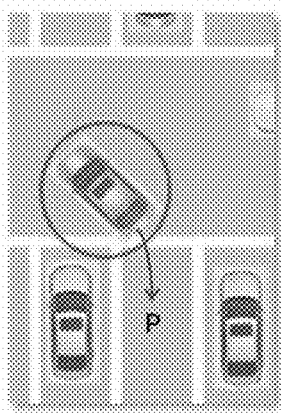
FIGS. 6A-6C are views illustrating examples of parking patterns to which the parking assist process according to one or more embodiments of the present invention is applied.
Figure 6B:
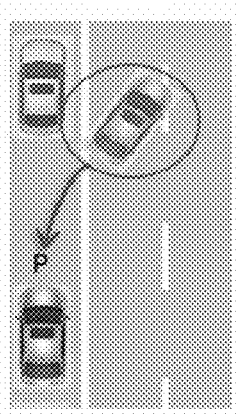
Figure 6C:
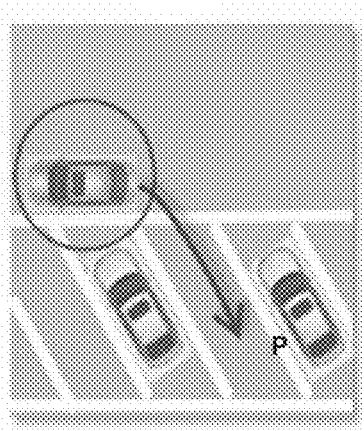

The control device 10 calculates the route corresponding to each of right-angle parking, parallel parking, and oblique parking illustrated in FIGS. 6A-6C, respectively. In one or more embodiments of the present invention, the process of calculating the route when parking has been described, but the present invention is not limited to this. In an alternative embodiment, a route corresponding to the type of the parking space is stored in a memory (ROM), and the route may be read out when parking. The parking mode (such as right-angle parking, parallel parking, and oblique parking) may be selected by the driver of the subject vehicle V.

In step 109, the parking assist apparatus 100 according to one or more embodiments of the present invention executes the parking assist process or the automated parking process. The parking assist apparatus 100 according to one or more embodiments of the present invention controls the operation of the drive system 40 via the vehicle controller 30 so that the subject vehicle V moves along the route.

The parking assist apparatus 100 calculates command signals to the drive system 40 of the subject vehicle V, such as an EPS motor, while feeding back the output value of the steering angle sensor 50 of the steering apparatus so that the travel trajectory of the subject vehicle V coincides with the calculated route, and sends the command signals to the drive system 40 or to the vehicle controller 30 which controls the drive system 40.

The parking assist apparatus 100 according to one or more embodiments of the present invention includes a parking assist control unit. The parking assist control unit acquires shift range information from an AT/CVT control unit, wheel speed information from an ABS control unit, steering angle information from a steering angle control unit, engine speed information from an ECM, and other necessary information. On the basis thereof, the parking assist control unit calculates and outputs instruction information on the automated steering to the EPS control unit, instruction information such as warning to a meter control unit, etc. The control device 10 acquires information items, which are acquired by the steering angle sensor 50 of the steering apparatus of the subject vehicle V and the vehicle speed sensor 60 and other sensors of the vehicle, via the vehicle controller 30.

The drive system 40 according to one or more embodiments of the present invention allows the subject vehicle V to move (travel) from the current position to the target parking space Mo by driving based on the control command signals acquired from the parking assist apparatus 100. The steering apparatus according to one or more embodiments of the present invention is a drive mechanism that moves the subject vehicle V in the right and left directions. The EPS motor included in the drive system 40 drives the power steering mechanism of the steering of the steering apparatus on the basis of the control command signals acquired from the parking assist apparatus 100 to control the steering amount and assists the operation when moving the subject vehicle V to the target parking space Mo. The content of the parking assist and the process of operation are not particularly limited, and processes known at the time of filing of this application can be appropriately applied.

When the parking assist apparatus 100 according to one or more embodiments of the present invention controls the subject vehicle V to move to the target parking space Mo along the route calculated based on the position P4 of the subject vehicle V and the position of the target parking space Mo, the accelerator and the brake are automatically controlled on the basis of the specified control vehicle speed (set vehicle speed), and the operation of the steering apparatus is also automatically controlled in accordance with the vehicle speed. That is, at the time of parking assist according to one or more embodiments of the present invention, the steering operation and the accelerator/brake operation are automatically performed. Furthermore, the parking assist apparatus 100 according to one or more embodiments of the present invention is also applicable to manual parking in which the driver performs operation of the accelerator, brake and steering.

In addition, it is also possible to perform a parking process by remote control that includes transmitting a setting command for the target parking space Mo, a parking process start command, a parking suspension/cancellation command, etc. to the subject vehicle V with no driver therein from the outside operator.

As will be understood, it is also possible for the driver to operate the accelerator/brake, and only the operation of the steering apparatus is automatically controlled. In this case, the parking assist apparatus 100 controls the drive system 40 on the basis of the set vehicle speed which is preliminarily calculated so that the subject vehicle V follows the route to move, and controls the steering apparatus of the subject vehicle V on the basis of the set steering angle which is also preliminarily calculated.

Thus, the parking assist apparatus 100 has an automated travel mode that does not require the operation by the driver and a manual operation mode that requires the operation by the driver. The automated travel mode includes a boarding operation mode in which the driver boards and operates the subject vehicle V and a remote operation mode in which the operator (driver) remotely controls the subject vehicle V from the outside of the subject vehicle V.

A method of presenting parking assist information in the parking assist apparatus 100 according to one or more embodiments of the present invention will be described below. In one or more embodiments of the present invention, the parking assist information is presented using the output device 20 which includes a display 21.

First, a method of displaying parking assist information using the display 21 will be described.

FIG. 7A illustrates an example of the method of displaying parking assist information. In the display example illustrated in FIG. 7A, two display regions are defined.

In the display example illustrated in FIG. 7A, the screen of the display 21 is divided into right and left, and a first display region on the left side and a second display region on the right side are defined. The first display region 21a on the left side displays an overhead image (top view) 21a while the second display region 21b on the right side displays a monitoring image (normal view) 21b. Messages 21c are displayed above the monitoring image 21b. The overhead image 21a as the first display region 21a includes an image (boundary lines of parking spaces) that indicates selectable parking spaces. The center of the overhead image 21a is displayed with an icon of the subject vehicle V indicating the position of the subject vehicle V. The monitoring image 21b can be displayed with different images captured by the cameras 1a to 1d in accordance with the operation state of the subject vehicle V. The monitoring image 21b illustrated in FIG. 7A is displayed as an image captured by the camera 1a which is disposed on the front grill part of the subject vehicle V. When the subject vehicle V moves back, the monitoring image 21b may be displayed as an image captured by the camera 1d which is disposed in the vicinity of the rear bumper. In this example, the overhead image 21a and the monitoring image 21b are simultaneously displayed on the display 21, but only the overhead image 21a may be displayed on the display 21, or only the monitoring image 21b may be displayed on the display 21.

The overhead image 21a includes a captured image of a predetermined display area around the subject vehicle V. The display area refers to an area in the real space including the subject vehicle V. The size of the display area can be set in accordance with the performance of the cameras 1a to 1d, the size of the display surface of the display 21, and the position of the virtual viewpoint for the overhead image (the height P in FIG. 3). In FIG. 3 for describing the overhead image, the display area R to be imaged is illustrated small due to limitations of space, but as illustrated in the overhead image 21a of FIG. 7A, the display area can be set, for example, within a range of about 10 m in length and about 5 m in width.

The display area (real space) which can be displayed in the display region of the display 21 is limited; therefore, parking spaces existing outside a predetermined display area may not be displayed so that it is included in the first display area (overhead image) 21a.

When the range of the display area is narrow, parking spaces may fall outside the display area, and the footage of the parking spaces may not be included in the display region of the display 21. When parking spaces are separate from the pathway for the subject vehicle V (the current position of the subject vehicle V), the parking spaces may fall outside the display area, and the footage of the parking spaces may not be included in the display region of the display 21. When the width of the pathway of the parking lot (width W1 in FIGS. 4A to 4D) is wide and the parking spaces are separated across the pathway, the footage of the pathway may occupy most of the display region of the display 21, and the footage of the parking spaces cannot be displayed in some cases. Also when the vehicle is traveling while deviating to the right or left side in the parking lot, the footage of parking spaces on the right or left side cannot be displayed in some cases.

Figure 7C:
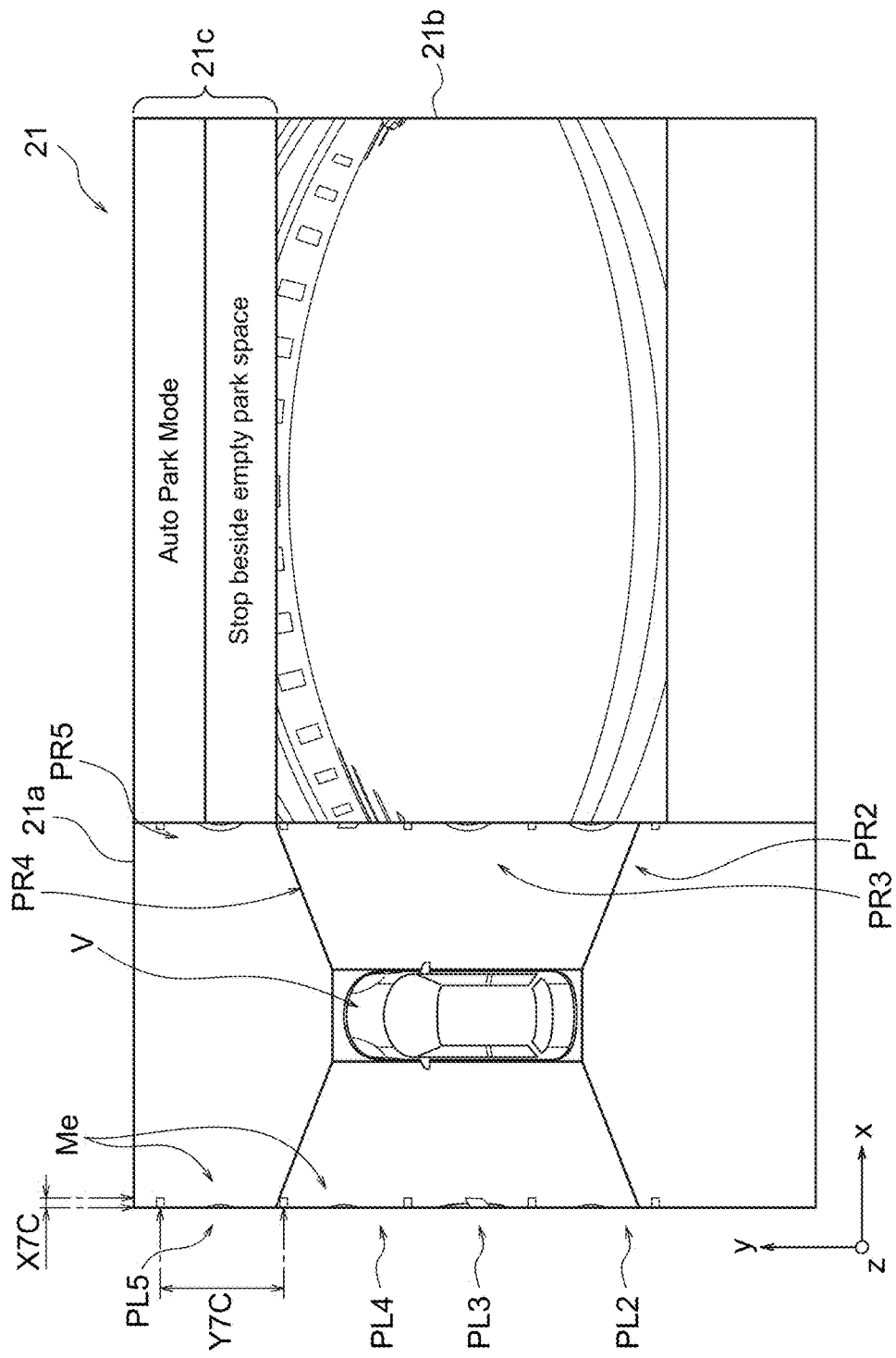
FIG. 7C is a third view illustrating an example of parking assist information presented in the parking assist process according to one or more embodiments of the present invention.

The display example in such a case is illustrated in FIG. 7B. In the display example of FIG. 7B, the footage of the pathway's surface occupies most of the display region, and the footage of the parking spaces on both sides of the pathway cannot be displayed. FIG. 7C illustrates a display example in the case of a wide pathway. In the display example of FIG. 7C, the footage of the pathway's surface occupies the display region of the display 21, and the driver cannot be informed of the existence of parking spaces.

Thus, even when parking spaces are detected, the detected parking spaces cannot be displayed in a predetermined display region (display region of the overhead image in this example) 21a of the display surface of the display 21 in some cases.

When the area of a region that is occupied by a detected parking space and displayed in the display region 21a is less than a predetermined value, the parking assist apparatus 100 according to one or more embodiments of the present invention displays a specific mark on the display 21. This mark indicates that a parking space that is not displayed in the display region 21a exists. Cases in which the area of a region that is occupied by a parking space and displayed in the display region 21a is less than a predetermined value include the following cases (A) and (B).

(A) When the ratio of an area of the parking space that appears in the display region 21a to the total area of the parking space is less than a predetermined value.

(B) When the ratio of an area of the parking space that does not appear in the display region 21a to the total area of the parking space is a predetermined value or more.

The area of a parking space may be preliminarily stored in the control device 10 or may also be calculated on the basis of the size of a detected parking space or on the basis of the length of a detected parking frame line or the distance between a pair of parking frame lines.

Parking spaces and a pathway for parking appear in the display region 21a; therefore, the area of a parking space may be determined from the pathway. In this case, the above conditions may be modified as follows.

(C) When the area of a pathway that appears in the display region 21a (or the occupation ratio of the footage of a pathway to the display region 21a) is a predetermined value or more, or the width of a pathway is a predetermined value or more.

The area of a parking space may be estimated using the length X of a parking frame that is displayed in the frame of the display region 21a (examples of X include X7A, X7B, and X7C, here and hereinafter) or using the width Y of a parking frame (examples of Y include Y7A, Y7B, and Y7C, here and hereinafter).

Although not particularly limited, in one or more embodiments of the present invention, the length X and width Y of a parking frame are those in the overhead image viewed from a virtual viewpoint set above.

The control device 10 according to one or more embodiments of the present invention calculates the length X7A of a parking frame that is displayed in the frame of the display region 21a and the width Y7A of a parking frame that is composed of a pair of lines, which are illustrated in FIG. 7A, on the basis of captured images. The control device 10 calculates the area of a parking space on the basis of the width Y7A of the parking frame. Even though there are parking spaces for standard-sized cars and parking spaces for large-sized cars such as buses and trucks, the size of parking spaces is uniform because they are defined in accordance with the size of vehicles. When the width Y of a parking frame is known, the total length of the parking frame can be estimated. The relationship between the width Y of a parking frame and the total length of the parking frame may be preliminarily stored. As will be understood, the area itself of a parking space may be stored.

On the basis of the length X7A of a parking frame that is displayed in the frame of the display region 21a and the width Y7A of the parking frame, the control device 10 calculates the ratio of an area of the parking space appearing in the display region 21a to the total area of the parking space.

The control device 10 estimates the total length of the parking frame and subtracts the length X7A of the parking frame displayed in the frame of the display region 21a from the total length of the parking frame to calculate the length of the parking frame which does not appear (is hidden) in the display region 21a.

The control device 10 calculates the ratio of the area of the parking space appearing in the display region 21a to the total area (estimated area) of the parking space obtained from the estimated total length of the parking frame and the width Y7A of the parking frame. Similarly, the control device 10 calculates the ratio of the area of the parking space which does not appear (is hidden) in the display region 21a to the total area (estimated area) of the parking space obtained from the estimated total length of the parking frame and the width Y7A of the parking frame.

Also in the example illustrated in FIG. 7B, on the basis of the length X7B of a parking frame that is displayed in the frame of the display region 21a and the width Y7B of the parking frame, the control device 10 calculates the ratio of an area of the parking space which appears or does not appear in the display region 21a to the total area of the parking space.

Also in the example illustrated in FIG. 7C, on the basis of the length X7C of a parking frame that is displayed in the frame of the display region 21a and the width Y7C of the parking frame, the control device 10 calculates the ratio of an area of the parking space which appears or does not appear in the display region 21a to the total area of the parking space.

As illustrated in FIGS. 7A, 7B, and 7C, as the parking spaces on both sides separate from each other, the ratio Q of the area of the parking space appearing in the display region 21a to the total area of the parking space decreases, that is, Q(7A)>Q(7B)>Q(7C). On the other hand, as the parking spaces on both sides separate from each other, the ratio Q of the area of the parking space which does not appear in the display region 21a to the total area of the parking space increases, that is, Q(7A)<Q(7B)<Q(7C). Thus, the situation that the parking space cannot be displayed in the display region 21a can be determined on the basis of the ratio of the area of the parking space which appears or does not appear in the display region 21a to the total area of the parking space.

The process of determination based on the area ratio is described herein, but the ratio of the length X of a parking frame that is displayed (or not displayed) in the frame of the display region 21a to the estimated total length of the parking frame may be deemed as the ratio of the area of the parking space which appears (or does not appear) in the display region 21a to the total area (estimated area) of the parking space.

In addition or alternatively, the ratio of the length X of a parking frame that is displayed (or not displayed) in the frame of the display region 21a to the width Y of the parking frame may be deemed as the ratio of the area of the parking space which appears (or does not appear) in the display region 21a to the total area (estimated area) of the parking space. This is because the total length (Y-direction) of a parking frame and the width Y of the parking frame correlate with each other.

Parking spaces can be estimated to be hidden from hidden lines of parking frames, and the hiding level of a parking space can be known based on the hiding level of lines of a parking frame.

The process of calculation in the parking pattern of right-angle parking (see FIG. 6A) is described herein, but a similar process can be applied to the oblique parking (see FIG. 6C).

Also in the parking pattern of parallel parking (see FIG. 6B), the control device 10 calculates the ratio of the area of a parking space that appears or does not appear in the display region 21a to the total area of the parking space on the basis of the length (in the vehicle width direction of the subject vehicle V) of the parking frame displayed in the frame of the display region 21a and the width (in the traveling direction of the subject vehicle V) of the parking frame. In the parallel parking, even when parking spaces on both sides separate from each other, the width (in the traveling direction of the subject vehicle V) of a parking frame may not vary. In such a case, it is difficult to determine whether an actually existing parking space cannot be seen or a parking space does not actually exist, only from the width of the parking frame. In such a case, it is preferred to calculate the area ratio from the length (in the vehicle width direction of the subject vehicle V) of the parking frame displayed in the frame of the display region 21a and a preliminarily-stored width (in the traveling direction of the subject vehicle V) of the parking frame.

When taking into account various parking patterns, it is preferred to use the area ratio to calculate whether the parking space can be displayed in the display region 21a only by the length of the parking frame or the parking space is hidden. The scope of the present invention encompasses a process of considering the ratio of lengths as the ratio of areas when calculating by the area ratio.

In one or more embodiments of the present invention, when the area of a region that is occupied by the parking space and displayed in the display region 21a is less than a predetermined value, a mark MK is displayed thereby to inform the driver that the parking space exists outside the display area. The mark MK according to one or more embodiments of the present invention is displayed to the driver and/or passengers when the driver or the system is searching for a parking space. The process of searching for a parking space may be executed when the vehicle is traveling or may also be executed when the vehicle is stopped. This can notify the driver and/or passengers that an available parking space exists outside the display area when searching for a parking space.

The form of the "mark MK" displayed on the display 21 is not particularly limited.

Figure 8A:
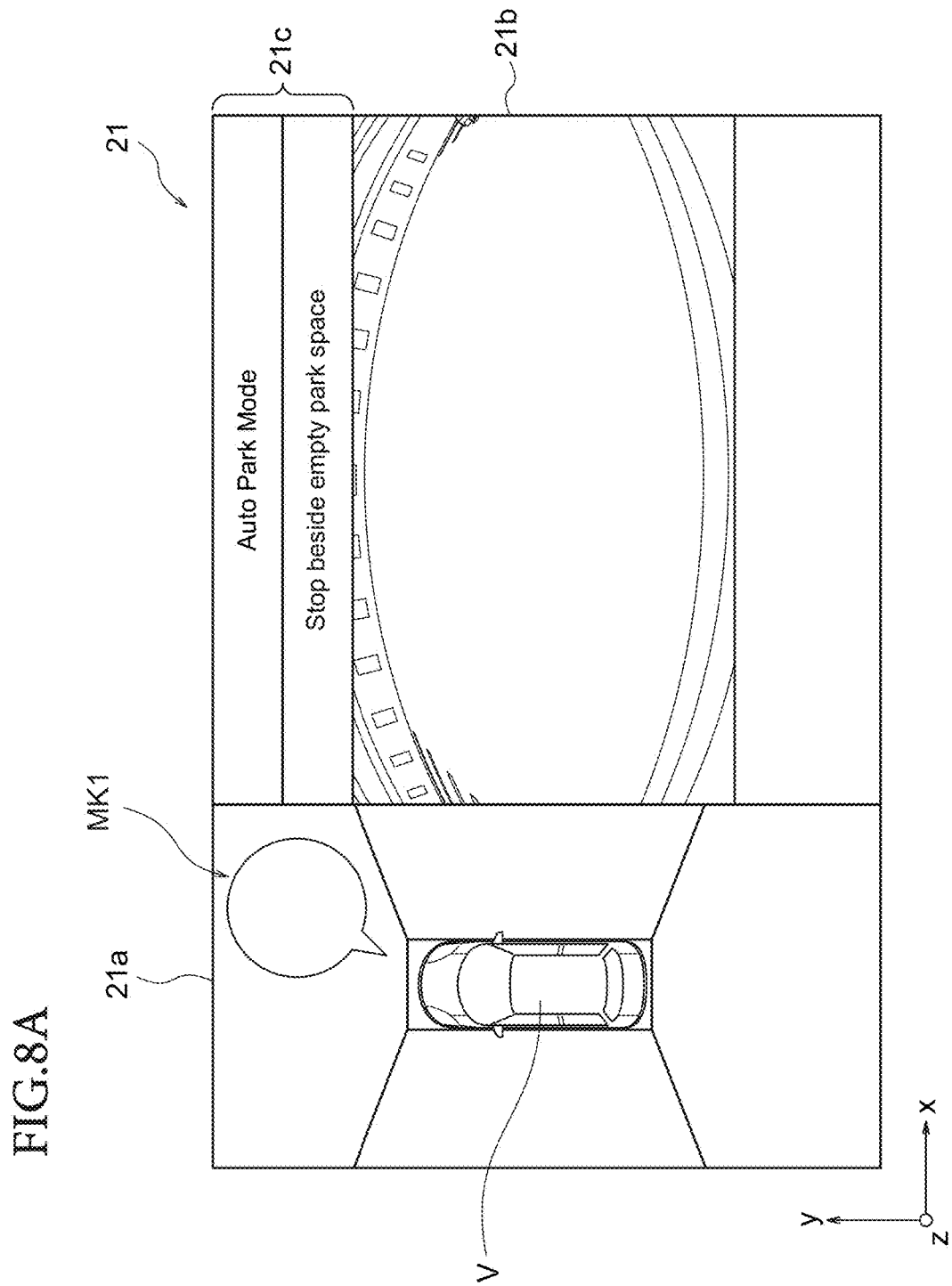
FIG. 8A is a first view illustrating a display/displaying example of the parking assist information.

For example, like the mark MK1 illustrated in FIG. 8A, a graphic may be rendered as a balloon in the display region 21a. The mark MK1 may be displayed in the display region 21b. The shape, color, form, and display process (such as blinking and fade-in/fade-out display) of the mark MK1 are not particularly limited. Text information may also be displayed together. For example, text such as "Parking space exists on the right side/left side," "Parking space cannot be displayed," and "Parking space exists outside the display region" may be displayed on the display 21. In addition or alternatively, text information may be output as voice via the speaker 22. The mark MK is preferably displayed in the display region 21a. When the parking space cannot be displayed in the display region 21a, the mark MK may be displayed in the display region 21a thereby to prevent the driver from feeling uneasy. Moreover, in one or more embodiments of the present invention, the mark MK is displayed when the parking space cannot be displayed in the display region 21a, and therefore the occupants (including the driver) can visually confirm in no time that the parking space exists outside the frame of the display region 21a.

By displaying the mark MK, the driver can use a parking space even when the parking space is not displayed in the display region of the display.

The mark MK according to one or more embodiments of the present invention can be represented by a diagram that indicates the direction in which a parking space exists with reference to the subject vehicle V. Examples of such a diagram that indicates the direction in which a parking space exists include polygons such as a triangle, rectangle, and rhombus and arrow graphics. As illustrated in FIG. 8B, the mark MK 2 may be an arrow graphic that indicates the direction in which a parking space exists. When the mark MK2 is represented by an arrow, the direction indicated by the arrow can show the direction in which the parking space exists. In addition or alternatively, as the distance between the subject vehicle V and the parking space is longer, the length of the arrow can be increased thereby to represent the relative distance from the subject vehicle V to the parking space.

The mark MK according to one or more embodiments of the present invention can be represented by an image that indicates a parking space. Examples of a diagram that indicates a parking space include a rectangle and other quadrangles, a pair of substantially parallel straight lines, and a U-shaped graphic obtained by connecting a pair of straight lines at one ends. As illustrated in FIG. 8C, the mark MK3 may also be a rectangular graphic or U-shaped graphic that imitates a parking space. When the mark MK3 is represented by such a rectangular graphic or U-shaped graphic that is common to the shape of a parking space, it is possible to inform that a parking space exists in the vicinity of a location corresponding to the graphic. In addition, the position of such a graphic can suggest the position at which a parking space exists.

These marks MK serve as selection buttons. The display 21 according to one or more embodiments of the present invention is a touch panel-type display. When a mark MK displayed on the display 21 is touched, its signal is sent to the control device 10. The control device 10 receives and recognizes the touch input on the mark MK displayed on the display 21 as an input of selection information of the mark MK. Each mark is associated with each parking space. The control device 10 recognizes the input of the selection information of a mark MK as an input of selection information of the parking space associated with the mark MK. When the selection information of a mark MK is input, the control device 10 according to one or more embodiments of the present invention sets the parking space associated with the mark MK as the target parking space Mo.

Thus, the control device 10 according to one or more embodiments of the present invention allows the selection of a parking space using the corresponding mark MK even when the parking space cannot be displayed on the display 21. The mark MK serves as an icon switch for selecting a parking space. Each mark MK is associated with each parking space. Each mark MK is preferably arranged adjacent to each displayed parking space so that the driver can easily understand the association. Even when the road surface of the parking lot is wide and the right and left parking spaces cannot be displayed on the operation display, the parking assist process can be executed.

The control device 10 displays the parking space corresponding to the mark MK selected by the driver or passenger as a recommended parking space Mr. When a parking space cannot be displayed on the display 21, even if the driver is presented with a recommended parking space Mr that is determined at the side of the parking assist apparatus 100, it may not be accepted by the driver. In such a case, it is preferred to prioritize the selection by the driver rather than the parking-related cost required for parking, such as the time required for parking.

Accordingly, when a parking space cannot be displayed on the display 21, marks MK are displayed, and any of the marks MK is selected (selection information is input), the control device 10 determines the parking space corresponding to the mark MK as a recommended parking space Mr. This recommended parking space Mr is preferably displayed in an emphasized manner, which will be described later. Even in a situation in which a parking space cannot be displayed on the display 21, the recommended parking space Mr corresponding to the situation is selected, so that the merit of the parking assist apparatus (method) can be prevented from being impaired. In one or more embodiments of the present invention, the parking space selected by the occupant (including the driver) may be set as a target parking space to be a target for parking.

Figure 8D:
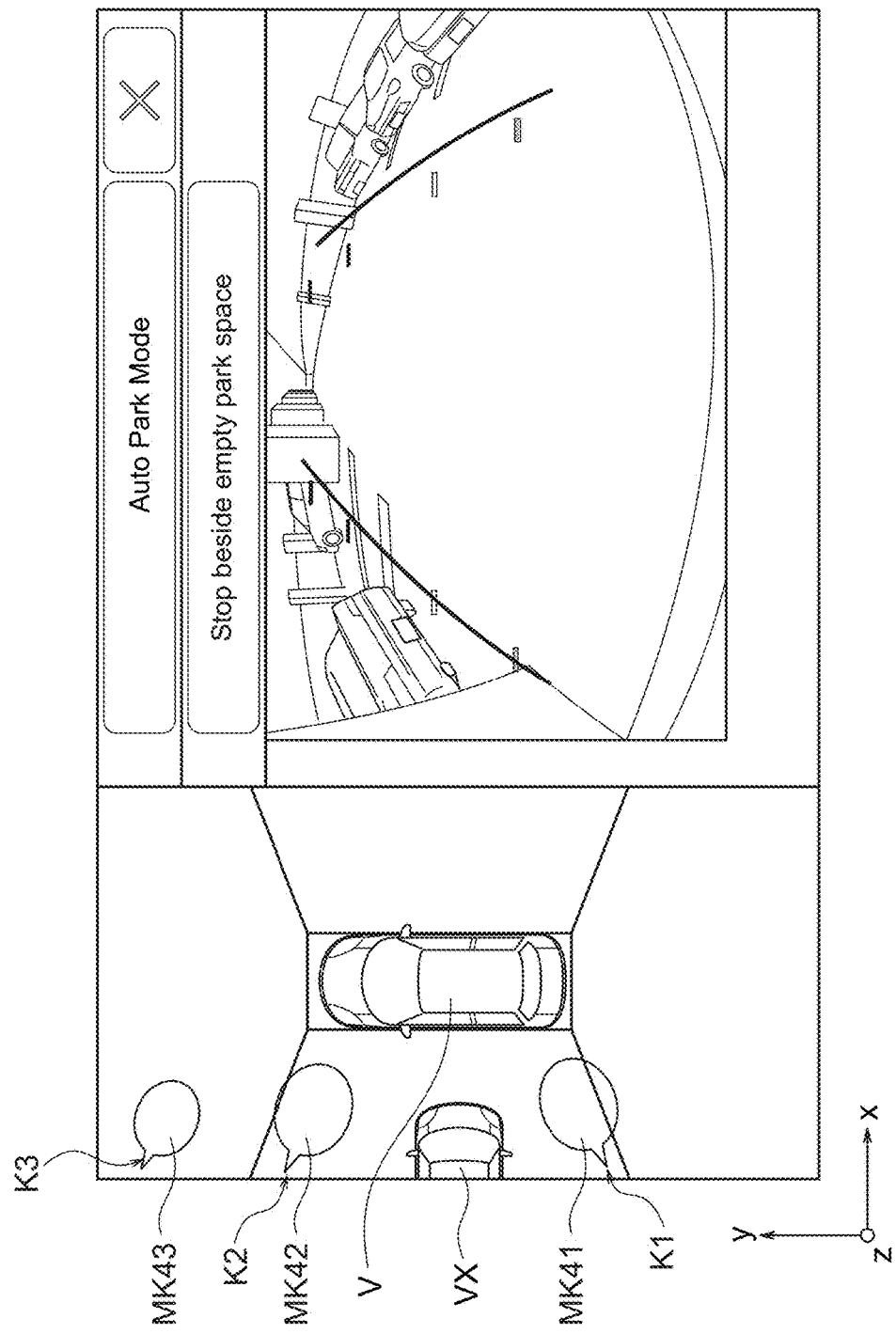
FIG. 8D is a fourth view illustrating a display/displaying example of the parking assist information.

The mark MK in one or more embodiments of the present invention can be displayed in accordance with the existence position of a parking space. Examples of diagrams indicating parking spaces include those having a curvature, such as a circle and an ellipse. In this case, a protrusion may be included in a part of the circular/elliptical graphic, and the direction in which a parking space exists may be indicated by the direction of the protrusion. As illustrated in FIG. 8D, marks MK4 (MK41, MK42, and MK43) can represent curved graphics (circles/ellipses) including protrusions K1, K2, and K3, respectively, thereby to suggest existence positions of parking spaces. Thus, as illustrated in the figure, a plurality of marks MK can be displayed.

In this case, the plurality of marks MK can be in different display forms.

Figure 8E:
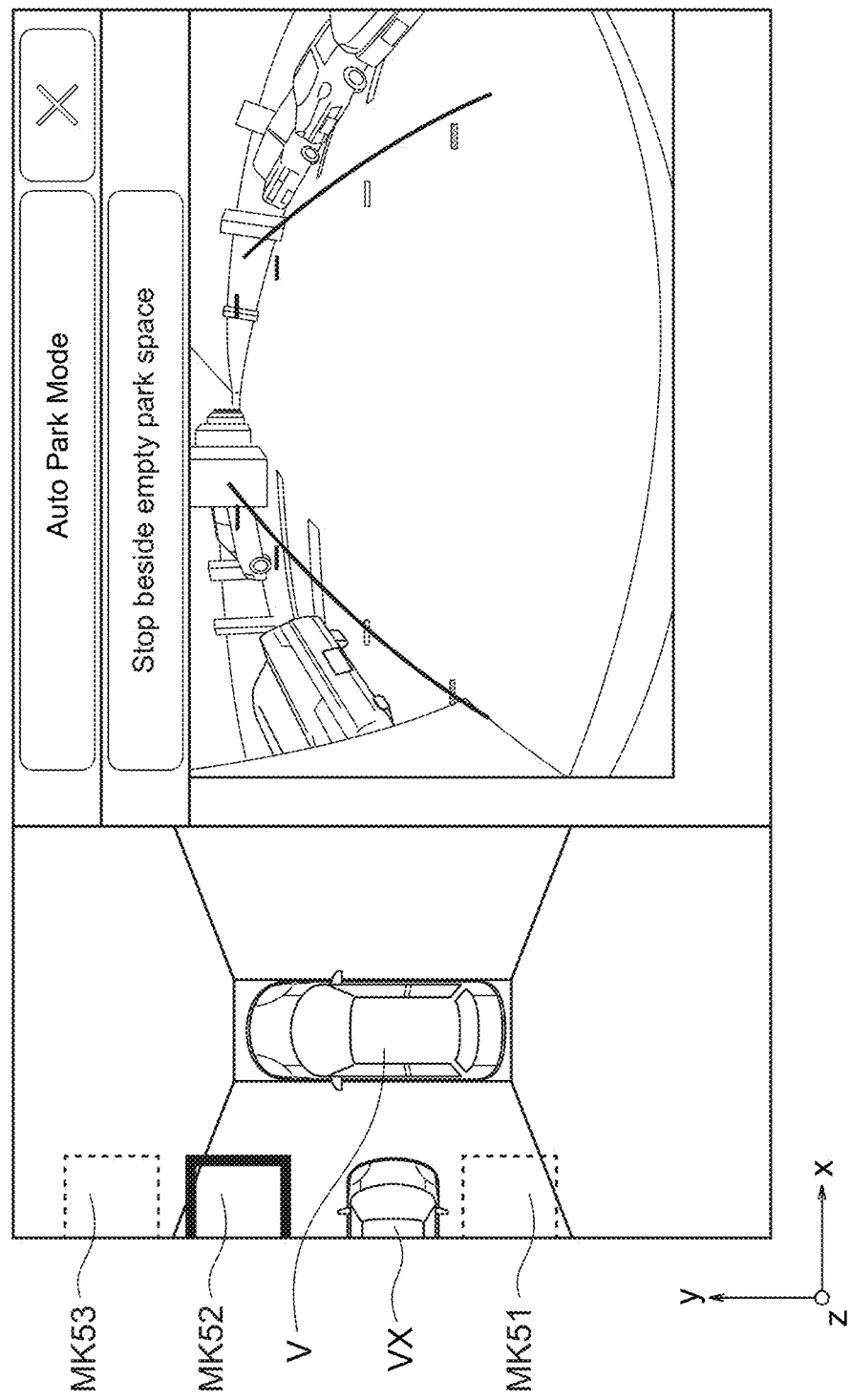
FIG. 8E is a fifth view illustrating a display/displaying example of the parking assist information.

As illustrated in FIG. 8E, among the plurality of marks MK, the mark MK of a recommended parking space that satisfies the parking recommendation condition and that is one of the available parking spaces satisfying the previously-described parking possible condition may be displayed in an emphasized manner. The driver can be informed of the existence of a recommended parking space and its position by the form of the mark MK which indicates a parking space even though the parking space cannot be displayed.

Emphasized display refers to a display form that gives a relatively strong stimulus to the visual sense of the driver and passengers and relatively strongly attracts attention of a person. Non-emphasized display refers to a display form that has a relatively weak effect of attracting attention of the driver and passengers.

The emphasized display according to one or more embodiments of the present invention can be expressed only in a relative relationship, but examples of the emphasized display include the following display forms.

(1) The mark MK of the recommended parking space is displayed with high luminance while the marks MK of other parking spaces are displayed with low luminance. High-luminance display refers to a display form in which the luminance is made relatively high.

(2) The line thickness of the mark MK of the recommended parking space is made relatively thick while the line thickness of diagrammatic images of the marks MK of other parking spaces is made relatively thin.

(3) The diagram of the mark MK of the recommended parking space is indicated by a solid line while the diagrams of the marks MK of other parking spaces are indicated by broken lines. The diagram in a first display form is indicated by a double line while the diagram in a second display form is indicated by a solid line or a broken line.

(4) The size of the diagrammatic image of the mark MK of the recommended parking space is made relatively large while the size of the diagrammatic images of the marks MK of other parking spaces is made relatively small.

(5) The mark MK of the recommended parking space is displayed in a blinking manner while the marks MK of other parking spaces are displayed in a non-blinking manner. Blinking display refers to a display form in which display and non-display are repeated at a predetermined cycle or lighting and extinction are repeated. The blinking cycle in the blinking display of the mark MK of the recommended parking space is made relatively short while the blinking cycle in the blinking display of the marks MK of other parking spaces is made relatively long.

(6) The diagram color of the mark MK of the recommended parking space is displayed in an advancing color with which the colored diagram is seen relatively close, while the diagram color of the marks MK of other parking space is displayed in a retreating color with which the colored diagrams are seen relatively far. The advancing color refers to a color with which the colored diagram is seen relatively close, that is, a relatively warm, highly bright, and/or highly chromatic color in the color circle, for example, yellow, orange, and red. On the other hand, the retreating color refers to a color with which the colored diagram is seen relatively far, that is, a relatively cold, poorly bright, and/or poorly chromatic color in the color circle, for example blue, purple, and black. The image displayed with such an advancing color is seen in a relatively emphasized manner.

(7) The pixel density of the mark MK of the recommended parking space is increased while the pixel density of the marks MK of other parking spaces is reduced. The pixel density refers to a density of pixels in the region corresponding to the diagrammatic image. The higher the pixel density, the more emphasized the display, while the lower the pixel density, the less emphasized the display.

When the selection information of a mark MK is input, the control device 10 expands the display area (real space) which can be displayed in a predetermined display region of the display 21. Then, an overhead image 21a of the expanded display area is created and displayed on the display 21.

Thus, even when a parking space cannot be displayed on the display 21, the control device 10 according to one or more embodiments of the present invention re-creates the overhead image 21a with the expanded display area thereby to display the parking space, which was not able to be displayed, on the display 21. Even when the road surface of the parking lot is wide and the right and left parking spaces cannot be displayed on the operation display, the parking assist process can be executed.

The control device 10 according to one or more embodiments of the present invention displays the mark MK in a more emphasized manner as the distance between the detected parking space and the subject vehicle V decreases. The subject vehicle V moves forward while searching for a parking space. The subject vehicle V approaches the target parking space Mo into which parking is intended. This will be more specifically described. A parking space with a shorter distance from the subject vehicle V has a higher degree of attention of the driver than a parking space with a longer distance from the subject vehicle V. As the distance from the subject vehicle V decreases, the control device 10 according to one or more embodiments of the present invention displays the mark MK in a more emphasized manner. Through this operation, even in a situation in which a parking space cannot be displayed on the display 21, the existence of a parking space having a high degree of attention of the driver can be presented to the driver in an emphasized manner. Although not particularly limited, in one or more embodiments of the present invention, the mark MK of a parking space that is located close to the subject vehicle V and located ahead of the subject vehicle V is displayed in an emphasized manner.

Examples of the display in accordance with the distance include the following forms. For explanation of the terms, the previously-described description will be borrowed herein.

(1) The mark MK of a parking space with a relatively short distance from the subject vehicle V is displayed with high luminance while the marks MK of other parking spaces with relatively long distances from the subject vehicle V are displayed with low luminance.

(2) The thickness of the diagram of the mark MK of a parking space with a relatively short distance from the subject vehicle V is made relatively thick while the thickness of the diagrams of the marks MK of other parking spaces with relatively long distances from the subject vehicle V is made relatively thin.

(3) The diagram of the mark MK of a parking space with a relatively short distance from the subject vehicle V is indicated by a solid line while the diagrams of the marks MK of other parking spaces with relatively long distances from the subject vehicle V are indicated by broken lines. The diagram of the mark MK of a parking space with a relatively short distance from the subject vehicle V is indicated by a double line while the diagrams of the marks MK of other parking spaces with relatively long distances from the subject vehicle V are indicated by solid lines or broken lines.

(4) The size of the diagrammatic image of the mark MK of a parking space with a relatively short distance from the subject vehicle V is made relatively large while the size of the diagrammatic images of the marks MK of other parking spaces with relatively long distances from the subject vehicle V is made relatively small.

(5) The mark MK of a parking space with a relatively short distance from the subject vehicle V is displayed in a blinking manner while the marks MK of other parking spaces with relatively long distances from the subject vehicle V are displayed in a non-blinking manner. The blinking cycle in the blinking display of the mark MK of a parking space with a relatively short distance from the subject vehicle V is made relatively short while the blinking cycle in the blinking display of the marks MK of other parking spaces with relatively long distances from the subject vehicle V is made relatively long.

(6) The diagram color of the mark MK of a parking space with a relatively short distance from the subject vehicle V is displayed in an advancing color while the color of the marks MK of other parking spaces with relatively long distances from the subject vehicle V is displayed in a retreating color.

(7) The pixel density of the mark MK of a parking space with a relatively short distance from the subject vehicle V is increased while the pixel density of the marks MK of other parking spaces with relatively long distances from the subject vehicle V is reduced.

Figure 9:
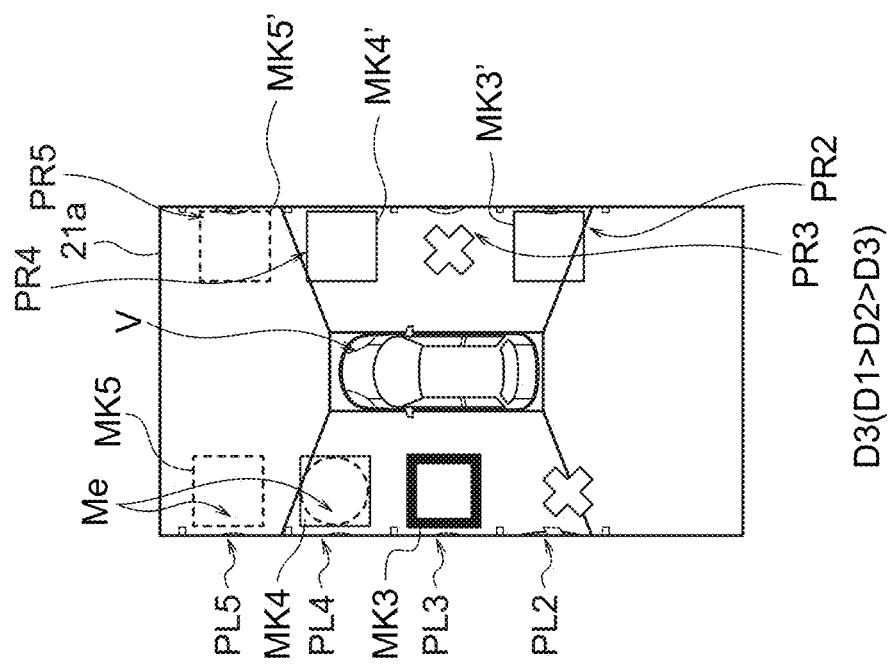
FIG. 9 is a view illustrating a display/displaying example of the parking assist information in accordance with a distance.

FIG. 9 illustrates an example of specific display of the marks MK in accordance with the distances between the parking spaces and the subject vehicle V. The display example of FIG. 9 includes parking spaces PL2 and PR3 into which parking is not possible and parking spaces PR2, PR4, PR5, PL3, PL4, and PL5 into which parking is possible. Among these, the mark MK 3 of the parking space PL3, which is closest to the subject vehicle V, is indicated in an emphasized manner with a relatively thick solid line. The mark MK 4 of the parking space PL4, which is close to the subject vehicle V next to the parking space PL3, is indicated by a solid line. The thickness of the mark MK4 is thinner than that of the mark MK3. The mark MK 5 of the parking space PL5, which is close to the subject vehicle V next to the parking space PL4, is indicated by a broken line. When the distance from the subject vehicle V increases in the order of the parking spaces PL3, PL4, and PL5, each mark MK is displayed such that the degree of emphasis satisfies the expression: mark MK3 (most emphasized)>mark MK4>mark MK 5. In the case of this example, the distances from the subject vehicle V to the parking space PL4 and the parking space PR4 are substantially the same, and they are therefore indicated by solid lines of the same thickness. The display form is not limited to this. In an alternative embodiment, to display the parking space PL4 adjacent to the closest parking space PL3 in a more emphasized manner than the parking space PR4, the mark MK4 may be indicated by a solid line while the mark MK4' by a broken line.

FIGS. 10A-1C illustrate examples of specific display of the marks MK in accordance with the distances between the parking spaces and the subject vehicle V. When distances D satisfy the expression: D1>D2>D3, FIG. 10A illustrates a display example of a mark MK when the distance is D1, FIG. 10B illustrates a display example of a mark MK when the distance is D2, and FIG. 10C illustrates a display example of a mark MK when the distance is D3.

The mark MK9$a$ illustrated in FIG. 10A is displayed with a line thickness that is relatively thinner than those of the display examples illustrated in FIGS. 10B and 10C. The mark MK9$a$ illustrated in FIG. 10A is indicated by a broken line. The mark MK9$b$ illustrated in FIG. 10B is displayed with a line thickness that is thicker than that of the display example illustrated in FIG. 10A and thinner than that of the display example illustrated in FIG. 10C. The outline of the mark MK9$b$ illustrated in FIG. 10B is indicated by a broken line. The mark MK9$c$ illustrated in FIG. 10C is displayed with a line thickness that is thicker than that of the display example illustrated in FIG. 10A. The outline of the mark MK9$c$ illustrated in FIG. 10C is indicated by s solid line. Thus, the control device 10 displays the marks MK so that the degree of emphasis increases as the distance from the subject vehicle V decreases.

The control device 10 according to one or more embodiments of the present invention displays the mark MK in a more emphasized manner as the speed of the subject vehicle V decreases. The subject vehicle V moves forward while searching for a parking space. The subject vehicle V decelerates when approaching a location at which parking is intended, that is, the target parking space Mo. This will be more specifically described. When the speed of the subject vehicle V decreases, a determination is made that the possibility that the driver determines the target parking space Mo for parking is high. As the speed of the subject vehicle V decreases, the control device 10 according to one or more embodiments of the present invention displays the mark MK in a more emphasized manner. Through this operation, even in a situation in which a parking space cannot be displayed on the display 21, the existence of a parking space can be presented to the driver in an emphasized manner at the timing when the driver wants to park.

Examples of the display in accordance with the speed include the following forms. For explanation of the terms, the previously-described description will be borrowed herein.

(1) When the vehicle speed of the subject vehicle V is relatively low, the mark MK of a parking space (examples of the parking space include the recommended parking space and the available parking spaces, here and hereinafter) is displayed with high luminance, while when the vehicle speed of the subject vehicle V is relatively high, the mark MK of a parking space is displayed with low luminance.

(2) When the vehicle speed of the subject vehicle V is relatively low, the thickness of the diagram of the mark MK of a parking space is made relatively thick, while when the vehicle speed of the subject vehicle V is relatively high, the thickness of the diagram of the mark MK of a parking space is made relatively thin.

(3) When the vehicle speed of the subject vehicle V is relatively low, the diagram of the mark MK of a parking space is indicated by a solid line, while when the vehicle speed of the subject vehicle V is relatively high, the diagram of the mark MK of a parking space is indicated by a broken line. When the vehicle speed of the subject vehicle V is relatively low, the diagram of the mark MK of a parking space is indicated by a double line, while when the vehicle speed of the subject vehicle V is relatively high, the diagram of the mark MK of a parking space is indicated by a solid line or a broken line.

(4) When the vehicle speed of the subject vehicle V is relatively low, the size of the diagrammatic image of the mark MK of a parking space is made relatively large, while when the vehicle speed of the subject vehicle V is relatively high, the size of the diagrammatic image of the mark MK of a parking space is made relatively small.

(5) When the vehicle speed of the subject vehicle V is relatively low, the mark MK of a parking space is displayed in a blinking manner, while when the vehicle speed of the subject vehicle V is relatively high, the mark MK of a parking space is displayed in a non-blinking manner. When the vehicle speed of the subject vehicle V is relatively low, the blinking cycle in the blinking display of the mark MK of a parking space is made relatively short, while when the vehicle speed of the subject vehicle V is relatively high, the blinking cycle in the blinking display of the mark MK of a parking space is made relatively long.

(6) When the vehicle speed of the subject vehicle V is relatively low, the diagram color of the mark MK of a parking space is displayed in an advancing color, while when the vehicle speed of the subject vehicle V is relatively high, the color of the mark MK of a parking space is displayed in a retreating color.

(7) When the vehicle speed of the subject vehicle V is relatively low, the pixel density of the mark MK of a parking space is increased, while when the vehicle speed of the subject vehicle V is relatively high, the pixel density of the mark MK of a parking space is reduced.

FIGS. 11A-11C illustrate examples of display of the marks MK in accordance with the speed of the subject vehicle V. When speeds V satisfy the expression: V1>V2>V3, FIG. 11A illustrates a display example of a mark MK when the speed is V1, FIG. 11B illustrates a display example of a mark MK when the speed is V2, and FIG. 11C illustrates a display example of a mark MK when the speed is V3.

The mark MK10$a$ illustrated in FIG. 11A is displayed with a graphic size that is relatively smaller than those of the display examples illustrated in FIGS. 11B and 11C. The mark MK10$b$ illustrated in FIG. 11B is displayed with a graphic size that is larger than that of the display example illustrated in FIG. 11A and smaller than that of the display example illustrated in FIG. 11C. The mark MK10$c$ illustrated in FIG. 11C is displayed with a graphic size that is larger than those of the display examples illustrated in FIGS. 11A and 11B. Thus, the control device 10 displays the marks MK so that the degree of emphasis increases as the vehicle speed decreases.

The method of displaying parking assist information according to one or more embodiments of the present invention is used in a parking assist apparatus as the above and therefore has the following effects. The parking assist apparatus 100 according to one or more embodiments of the present invention is configured and operates as the above and therefore has the following effects.

(1) The method of displaying parking assist information according to one or more embodiments of the present invention includes detecting a parking space on the basis of a parking condition that is preliminarily defined and displaying the detected parking space in the predetermined display region 21$a$ defined on the display surface of the display 21. When the area of a region that is occupied by the parking space and displayed in the display region 21$a$ is less than a predetermined value, the mark MK is displayed on the display 21. The mark MK indicates that the parking space exists in a region that is not displayed in the display region 21$a$. In other words, the mark MK indicates that the parking space exists in a region that is not displayed in the display region 21$a$. This allows the display 21 to display the mark MK which indicates that the parking space exists in a region that is not displayed in the display region 21$a$. In one or more embodiments of the present invention, when the area of a region that is occupied by the parking space and displayed in the display region 21$a$ is less than a predetermined value, display of the mark MK can inform the user that an available parking space exists outside the display area. This allows the user to use a parking space even when the parking space is not displayed in the display region of the display.

(2) According to the method of displaying parking assist information in one or more embodiments of the present invention, the mark MK indicates the direction in which a parking space exists with reference to the subject vehicle V. Even when a parking space is not displayed on the display 21, display of the mark MK allows the driver and/or passengers to be informed that a parking space exists around the subject vehicle V and/or informed of the position of a parking space. When the mark MK is represented by an arrow, the user can be informed that a parking space exists in the direction indicated by the arrow. Moreover, the length of the arrow can be determined in accordance with the distance between the subject vehicle V and a parking space thereby to indicate the relative distance to the parking space.

(3) According to the method of displaying parking assist information in one or more embodiments of the present invention, the mark MK indicates a parking space. Even when a parking space is not displayed on the display 21, display of the mark MK allows the driver and/or passengers to be informed that a parking space exists around the subject vehicle V and/or informed of the position of a parking space. When the mark MK is represented by a rectangular graphic or U-shaped graphic that is common to the shape of a parking space, it is possible to suggest that a parking space exists in the vicinity of a location corresponding to the graphic. In addition, the position of such a graphic can suggest the position at which a parking space exists.

(4) According to the method of displaying parking assist information in one or more embodiments of the present invention, the mark MK is displayed in a more emphasized manner as the distance between a parking space and the subject vehicle V decreases. A parking space with a shorter distance from the subject vehicle V has a higher degree of attention of the driver than a parking space with a longer distance from the subject vehicle V. As the distance from the subject vehicle V decreases, therefore, the mark MK indicating the parking space is displayed in a more emphasized manner. Through this operation, even in a situation in which a parking space cannot be displayed on the display 21, the existence of a parking space having a high degree of attention of the driver can be presented to the driver in an emphasized manner.

(5) According to the method of displaying parking assist information in one or more embodiments of the present invention, the mark MK is displayed in a more emphasized manner as the speed of the subject vehicle V decreases. When the speed of the subject vehicle V is lowered, the mark MK which indicates a parking space is displayed in a more emphasized manner as the speed of the subject vehicle V decreases from the viewpoint of determination of the target parking space Mo and also from the viewpoint that the possibility of parking is high. Through this operation, even in a situation in which a parking space cannot be displayed on the display 21, the timing when the driver wants to park can be estimated from the speed, and the existence of a parking space can be presented to the driver in an emphasized manner.

(6) According to the method of displaying parking assist information in one or more embodiments of the present invention, when the selection information of a mark MK is input, the parking space associated with the mark MK is set as a target parking space Mo. This allows the selection of a parking space using the corresponding mark MK even when the parking space cannot be displayed on the display 21. Even when the road surface of a parking lot is wide and the right and left parking spaces cannot be displayed on the operation display, the parking assist process can be executed.

(7) According to the method of displaying parking assist information in one or more embodiments of the present invention, when the selection information of a mark MK is input, the display area which can be displayed in a predetermined display region 21a is expanded. Even when a parking space cannot be displayed on the display 21, the overhead image 21a is re-created with the expanded display area thereby to display the parking space, which was not able to be displayed, on the display 21. Even when the road surface of the parking lot is wide and the right and left parking spaces cannot be displayed on the operation display, the parking assist process can be executed.

(8) According to the method of displaying parking assist information in one or more embodiments of the present invention, the parking space corresponding to the selected mark MK is displayed as a recommended parking space. Under a situation in which a parking space cannot be displayed on the display 21, the selection by the driver is prioritized. Even in a situation in which a parking space cannot be displayed on the display 21, the recommended parking space Mr corresponding to the situation is selected, so that the merit of the parking assist apparatus (method) can be prevented from being impaired.

(9) According to the method of displaying parking assist information in one or more embodiments of the present invention, among the available parking spaces, a recommended parking space that satisfies the parking recommendation condition belonging to the parking condition is detected as the parking space, and the mark MK which indicates that the recommended parking space exists is displayed on the display 21 in an emphasized manner. The driver can be informed of the existence of the recommended parking space and its position by the form of the mark MK which indicates a parking space even in a situation in which the parking space cannot be displayed.

(10) The above-described parking assist method/method of displaying parking assist information can be carried out using the parking assist apparatus 100 according to one or more embodiments of the present invention. Thus, the parking assist apparatus 100 according to one or more embodiments of the present invention has the above-described actions and effects.

Embodiments heretofore explained are described to facilitate understanding of the present invention and are not described to limit the present invention. It is therefore intended that the elements disclosed in the above embodiments include all design changes and equivalents to fall within the technical scope of the present invention.

That is, in the present description, an example of the parking assist apparatus 100 having the control device 10 and the display 21 is described as an embodiment of the parking assist apparatus according to the present invention, but the present invention is not limited to this.

REFERENCE SIGNS LIST

1000 Parking assist system
100 Parking assist apparatus
10 Control device
11 CPU
12 ROM
13 RAM
20 Output device
21 Display
22 Speaker
1a-1d Onboard cameras
2 Image processing device
3 Ranging device
30 Vehicle controller
40 Drive system
50 Steering angle sensor
60 Vehicle speed sensor
V Subject vehicle
Me Available parking space, Parking available mark
Mr Recommended parking space, Recommendation mark
Mo Target parking space

The invention claimed is:

1. A method of displaying parking assist information, the method being used in a parking assist apparatus, the parking assist apparatus comprising:
a control device configured to specify a parking space on a basis of a parking condition that is preliminarily defined; and
a display configured to display the parking space specified by the control device in a predetermined display region defined on a display surface,
the method comprising:
in response to an area of a region that is occupied by the parking space and displayed in the display region being less than a predetermined value:
displaying, on the display at timing before a target parking space is set by a driver or passenger of a subject vehicle, a mark indicating that the parking space exists in a region that is not displayed in the display region.

2. The method according to claim 1, wherein the mark indicates a direction in which the parking space exists with reference to the subject vehicle.

3. The method according to claim 1, wherein the mark indicates existence of the parking space.

4. The method according to claim 1, wherein the control device is configured to display the mark in an emphasized manner as a distance between the specified parking space and the subject vehicle decreases.

5. The method according to claim 1, wherein the control device is configured to display the mark in an emphasized manner as a speed of the subject vehicle decreases.

6. The method according to claim 1, wherein
the display is configured to receive input information, and
the control device is configured to, when selection information of the mark is input, set the parking space associated with the mark as a target parking space.

7. The method according to claim 1, wherein the control device is configured to, when selection information of the mark is input, expand a display area that can be displayed in the predetermined display region.

8. The method according to claim 7, wherein the control device is configured to display the parking space corresponding to the selected mark as a recommended parking space.

9. The method according to claim 1, wherein the control device is configured to:
detect available parking spaces into which parking is possible;
detect a recommended parking space among the available parking spaces as the parking space, the recommended parking space satisfying a parking recommendation condition that belongs to the parking condition; and
display the mark on the display in an emphasized manner, the mark indicating that the recommended parking space exists.

10. The method of claim 1, wherein the display is configured to display a second parking space that is designated as a recommended parking space, and wherein a first display pattern of the parking space is different from a second display pattern of the recommended parking space.

11. The method of claim 1, wherein a position on the display of the mark indicating the parking space is unrelated to the area of the region that is occupied by the parking space.

12. The method of claim 1, wherein the mark partially overlays the area of the region that is occupied by the parking space.

13. The method of claim 1, wherein the area of the region that is occupied by the parking space and displayed in the display region is determined to be less than the predetermined value based on a ratio of the area of the region that is occupied by the parking space and displayed in the display region to a total area of the parking space.

14. The method of claim 1, wherein the area of the region that is occupied by the parking space and displayed in the display region is determined to be less than the predetermined value based on a ratio of a first dimension of the area of the region that is occupied by the parking space and displayed in the display region to a corresponding dimension of the parking space.

15. The method of claim 1, wherein a position in the display region of a parking frame of the parking space displayed in the display region is different from a position in the display region of the mark indicating that the parking space exists in the region that is not displayed in the display region.

16. A parking assist apparatus comprising:

a control device configured to specify a parking space on a basis of a parking condition that is preliminarily defined; and a display configured to display the parking space specified by the control device in a predetermined display region defined on a display surface, wherein, when an area of a region that is occupied by the parking space and displayed in the display region is less than a predetermined value, the control device controls the display to display a mark at timing before a target parking space is set by a driver or passenger, wherein the mark indicates that the parking space exists in a region that is not displayed in the display region.

* * * * *